United States Patent
Nakajima et al.

(10) Patent No.: US 6,861,661 B1
(45) Date of Patent: *Mar. 1, 2005

(54) RADIATION IMAGE READ-OUT APPARATUS AND IMAGE TRANSMISSION APPARATUS

(75) Inventors: Nobuyoshi Nakajima, Kaisei-machi (JP); Satoshi Arakawa, Kaisei-machi (JP); Eiji Ogawa, Kaisei-machi (JP); Kazuo Shimura, Kaisei-machi (JP); Masahiko Yamada, Kaisei-machi (JP); Akira Yamaguchi, Kaisei-machi (JP)

(73) Assignee: Fuji Photo Film Co., Ltd., Kanagawa-Ken (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 482 days.

(21) Appl. No.: 09/030,908

(22) Filed: Feb. 26, 1998

(30) Foreign Application Priority Data

| Mar. 6, 1997 | (JP) | ............................................. | 9-051536 |
| Mar. 6, 1997 | (JP) | ............................................. | 9-051537 |
| Mar. 6, 1997 | (JP) | ............................................. | 9-051538 |
| Mar. 6, 1997 | (JP) | ............................................. | 9-051539 |
| Mar. 6, 1997 | (JP) | ............................................. | 9-051540 |
| Mar. 6, 1997 | (JP) | ............................................. | 9-051541 |

(51) Int. Cl.$^7$ ............................................. G03B 42/02
(52) U.S. Cl. ........................ 250/584; 250/585; 250/586
(58) Field of Search ................................. 250/581, 582, 250/584, 585, 586, 458.1; 385/116

(56) References Cited

U.S. PATENT DOCUMENTS

| 3,915,754 | A | * | 10/1975 | Sculze et al. | ................ | 250/338 |
| 4,141,756 | A | * | 2/1979 | Chiang et al. | ................. | 438/87 |
| 4,369,367 | A | * | 1/1983 | Horikawa | ................... | 250/586 |
| 4,570,063 | A | * | 2/1986 | De Bie et al. | ............... | 250/227 |
| 4,792,691 | A | * | 12/1988 | Morlotti et al. | ........... | 250/484.4 |
| 4,814,618 | A | * | 3/1989 | Saito et al. | ................... | 250/587 |
| 4,818,880 | A | * | 4/1989 | Matsuda et al. | ............. | 250/584 |
| 4,953,038 | A | * | 8/1990 | Schiebel et al. | ............ | 358/471 |
| 5,023,014 | A | * | 6/1991 | Toda et al. | ............... | 250/301.4 |
| 5,051,589 | A | * | 9/1991 | Arakawa | ..................... | 250/581 |
| 5,340,996 | A | | 8/1994 | Fukuoka et al. | | |
| 5,367,173 | A | * | 11/1994 | Morlotti | .................. | 250/484.4 |
| 5,534,709 | A | * | 7/1996 | Yoshimoto et al. | ......... | 250/588 |
| 5,659,133 | A | * | 8/1997 | Sims et al. | .................... | 73/116 |
| 5,769,916 | A | * | 6/1998 | Immel | ........................ | 356/414 |
| 5,953,133 | A | * | 9/1999 | Fujimaya et al. | ........... | 354/474 |
| 5,998,802 | A | * | 12/1999 | Struye et al. | ................ | 250/584 |

FOREIGN PATENT DOCUMENTS

EP 0155478 A2 9/1985

OTHER PUBLICATIONS

Patent Abstracts of Japan, vol. 1997, No. 04, Apr. 30, 1997, JP08327798.

* cited by examiner

*Primary Examiner*—Albert J. Gagliardi
(74) *Attorney, Agent, or Firm*—Sughrue Mion, PLLC

(57) ABSTRACT

A linear stimulating ray source produces stimulating rays and linearly irradiates them to a portion of a stimulable phosphor sheet, on which a radiation image has been stored. A photoelectric read-out system divides light, which is emitted from the portion of a front surface of the stimulable phosphor sheet exposed to the stimulating rays and/or the portion of a back surface of the stimulable phosphor sheet corresponding to the portion of the front surface exposed to the stimulating rays, into picture elements along a length direction of the portion exposed to the stimulating rays, and photoelectrically reads out the divided picture elements by arraying them in a two-dimensional form. A scanning system moves the stimulable phosphor sheet with respect to the linear stimulating ray source and the photoelectric read-out system and in a direction, which is approximately normal to the length direction of the portion exposed to the stimulating rays.

1 Claim, 13 Drawing Sheets

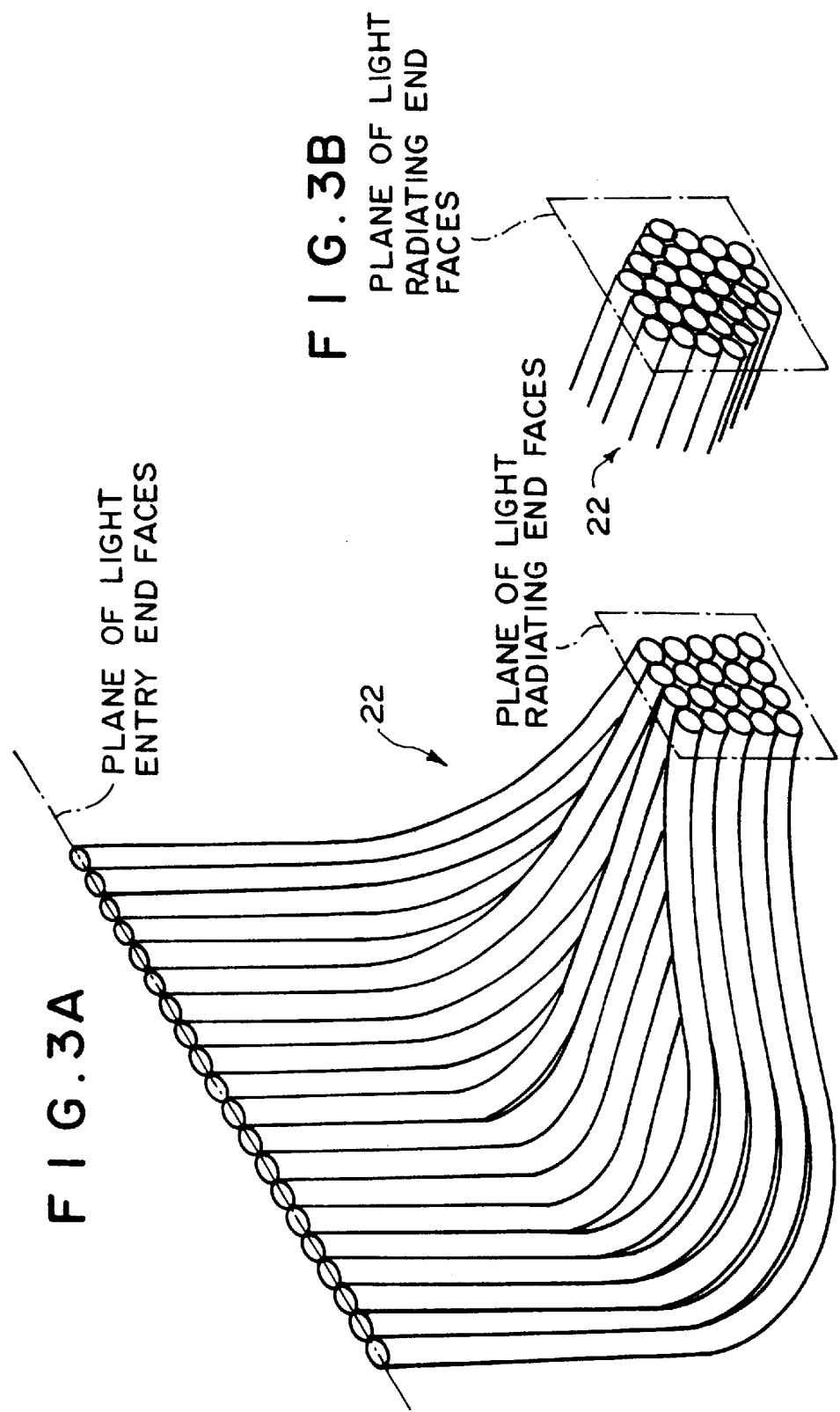

F I G. 4
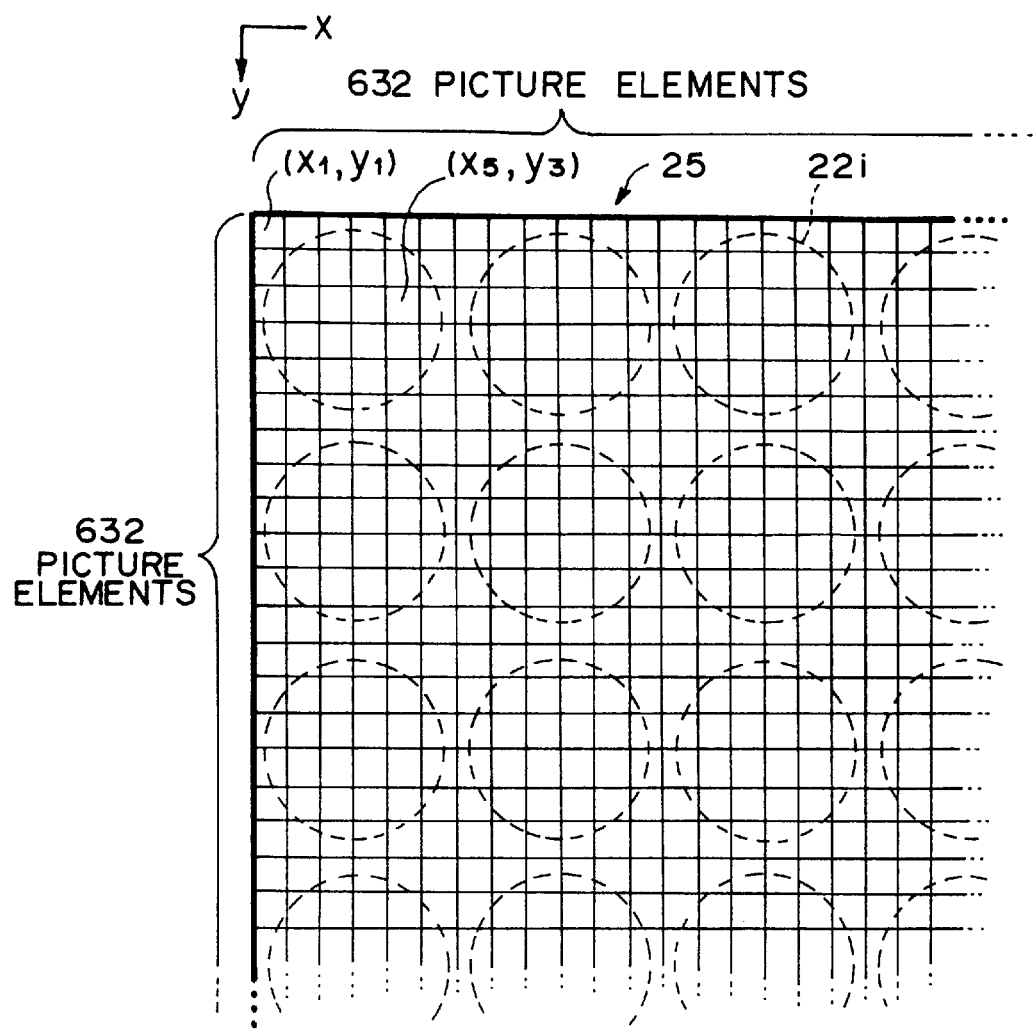

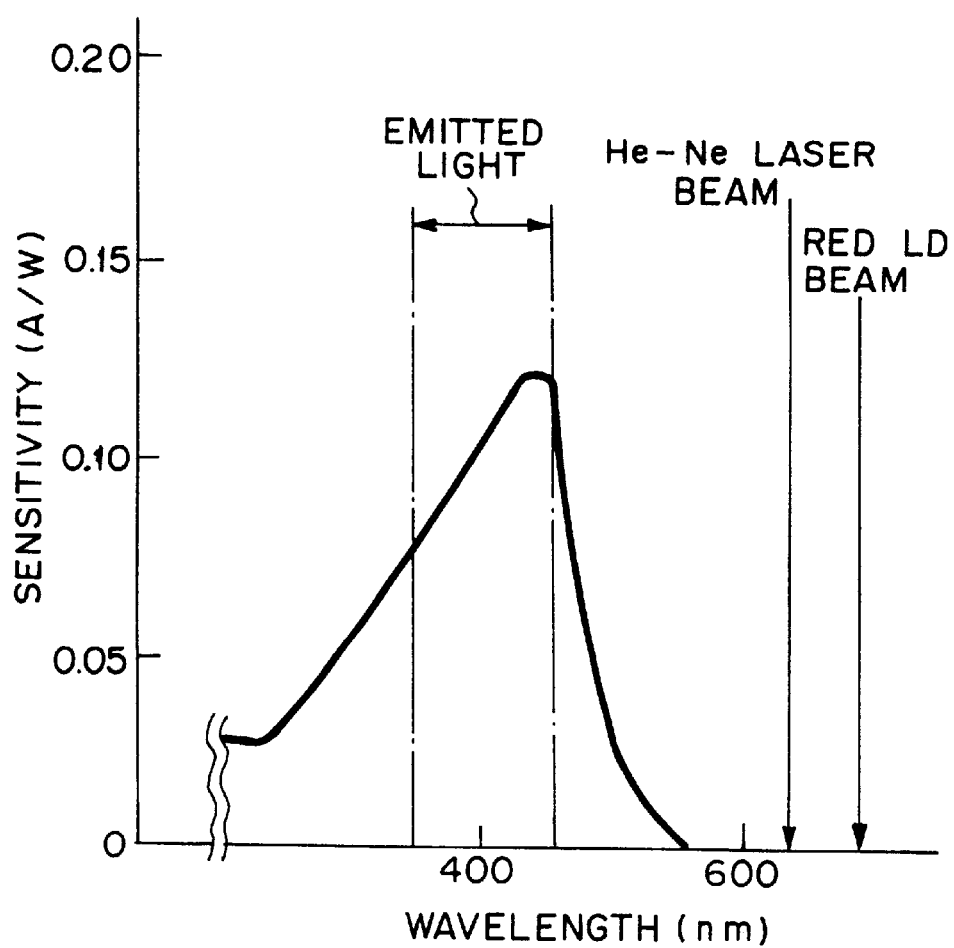
F I G. 11

F I G. 15A
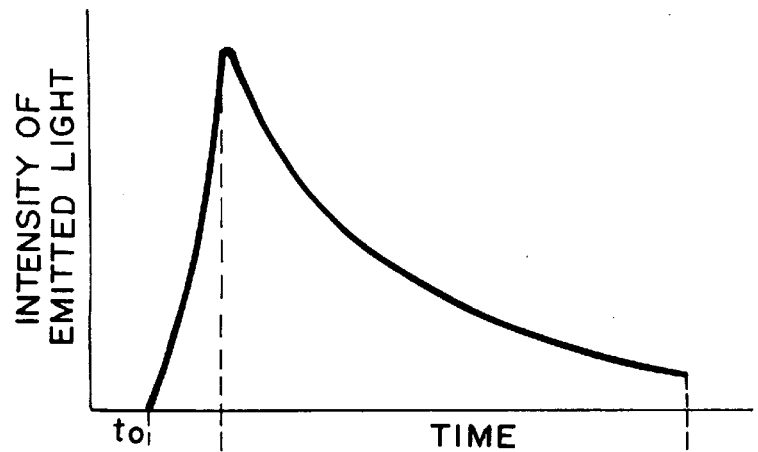
F I G. 15B
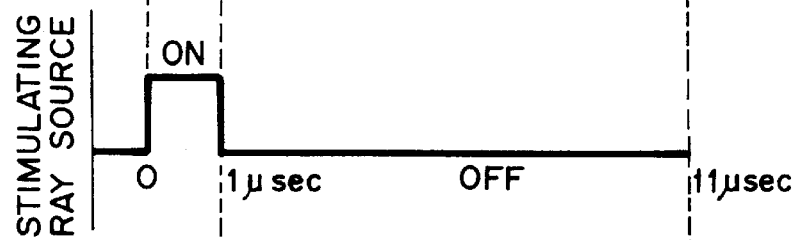
F I G. 15C
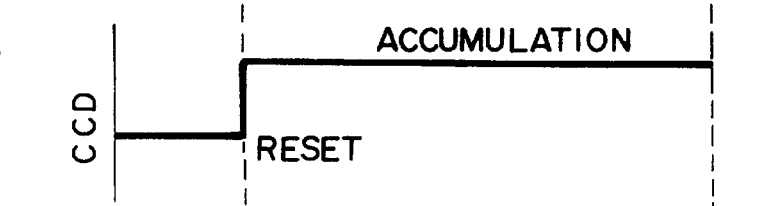
F I G. 15D
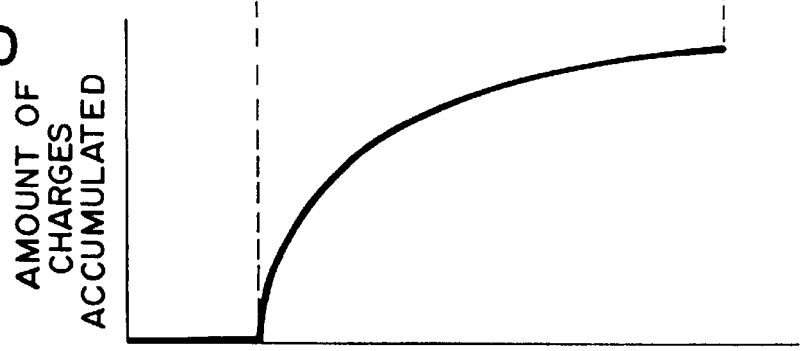

RADIATION IMAGE READ-OUT APPARATUS AND IMAGE TRANSMISSION APPARATUS

BACKGROUND OF THE INVENTION

1. Field of the Invention

This invention relates to a radiation image read-out apparatus, an image transmission apparatus, and a radiation image read-out and reproducing apparatus utilizing the radiation image read-out apparatus. This invention particularly relates to an improvement in an apparatus for reading out a radiation image having been stored on a stimulable phosphor sheet, an apparatus for transmitting an image through an optical fiber bundle, and a radiation image read-out and reproducing apparatus utilizing the improved radiation image read-out apparatus.

2. Description of the Prior Art

It has been proposed to use stimulable phosphors in radiation image recording and reproducing systems. Specifically, a radiation image of an object, such as a human body, is recorded on a sheet provided with a layer of the stimulable phosphor (hereinafter referred to as a stimulable phosphor sheet). Picture elements in the radiation image, which has been stored on the stimulable phosphor sheet, are then successively scanned with stimulating rays, such as a laser beam, which cause the stimulable phosphor sheet to emit light in proportion to the amount of energy stored thereon during its exposure to radiation. The light, which is successively emitted from the picture elements on the stimulable phosphor sheet, upon stimulation thereof, is photoelectrically detected and converted into an electric image signal. The stimulable phosphor sheet, from which the image signal has been detected, is exposed to erasing light, and energy remaining on the stimulable phosphor sheet is thereby released.

The image signal, which has been obtained with the radiation image recording and reproducing systems, is subjected to image processing, such as gradation processing or frequency processing, such that a visible radiation image having good image quality can be reproduced and used as an effective tool in, particularly, the accurate and efficient diagnosis of an illness. The image signal having been obtained from the image processing is used for reproducing a visible image on photographic film or displaying the visible image on a high definition cathode ray tube (CRT) display device. The reproduced visible image is used, for example, in making a diagnosis by a medical doctor, or the like. The stimulable phosphor sheet, from which the remaining energy has been released by its exposure to the erasing light, can be repeatedly used for the recording of a radiation image.

However, in radiation image read-out apparatuses which are employed in the radiation image recording and reproducing systems described above, it is necessary to use a high-quality laser beam as the stimulating rays and to use an expensive photomultiplier as means for photoelectrically detecting the light emitted by the stimulable phosphor sheet. Further, it is necessary for the radiation image read-out apparatuses to be provided with a laser beam scanning system and a converging optical system for detecting the light emitted by the stimulable phosphor sheet as signals, each of which represents one of the picture elements. Therefore, the cost of the radiation image read-out apparatuses cannot be kept low. The high cost of the radiation image read-out apparatuses is one of obstacles to the promotion of wide use of the radiation image recording and reproducing systems.

SUMMARY OF THE INVENTION

The primary object of the present invention is to provide a low-cost radiation image read-out apparatus, in which low-cost parts are employed and the production cost of which is thereby kept low.

Another object of the present invention is to provide an image transmission apparatus, wherein a bundle of optical fibers, which are bundled such that the relationship between the position of each of the optical fibers in the bundle on the side of light entry end faces and the position of the optical fiber in the bundle on the side of light radiating end faces may be arbitrary, is employed, and light signal components representing an image, which impinge upon the light entry end faces of the optical fibers, are transmitted at a low cost.

A further object of the present invention is to provide a radiation image read-out and reproducing apparatus, in which low-cost parts are employed and the production cost of which is thereby kept low.

A first radiation image read-out apparatus in accordance with the present invention is characterized by employing a linear stimulating ray source as a stimulating ray source for producing stimulating rays, which cause a stimulable phosphor sheet to emit light in proportion to the amount of energy stored thereon during its exposure to radiation, and detecting the linear light, which is emitted from a front surface and/or a back surface of the stimulable phosphor sheet, by dividing the linear light into picture elements with a photoelectric read-out means, hereinafter referred to simply as a "photoelectric read-out means".

Specifically, the present invention provides a first radiation image read-out apparatus, comprising:

i) a linear stimulating ray source for producing stimulating rays and linearly irradiating the stimulating rays to a portion of a stimulable phosphor sheet, on which a radiation image has been stored, the stimulating rays causing the stimulable phosphor sheet to emit light in proportion to the amount of energy stored thereon during its exposure to radiation, ii) a photoelectric read-out means for dividing the light, which is emitted from the portion of a front surface of the stimulable phosphor sheet exposed to the stimulating rays (the front surface being the surface on the stimulating ray irradiation side) and/or the portion of a back surface of the stimulable phosphor sheet corresponding to the portion of the front surface exposed to the stimulating rays (the back surface being the surface opposite to the stimulating ray irradiation side), into a plurality of picture elements along a length direction of the portion exposed to the stimulating rays, and photoelectrically reading out the plurality of the picture elements, which have been obtained from the division of the emitted light into the picture elements, by arraying the picture elements in a two-dimensional form, and iii) a scanning means for moving the stimulable phosphor sheet with respect to the linear stimulating ray source and the division-into-picture-element photoelectric read-out means and in a direction, which is approximately normal to the length direction of the portion exposed to the stimulating rays.

The term "division into picture elements" as used herein means that the approximately linear light, which is emitted by the stimulable phosphor sheet, is divided into a plurality of small-sized portions corresponding to the picture elements.

In the first radiation image read-out apparatus in accordance with the present invention (and in a radiation image read-out and reproducing apparatus and various radiation image read-out apparatuses in accordance with the present invention, which will be described later), the surface of the stimulable phosphor sheet, from which the division-into-picture-element photoelectric read-out means detects the emitted light, may be either one of the front surface and the back surface of the stimulable phosphor sheet. Alternatively, the division-into-picture-element photoelectric read-out means may approximately simultaneously detect the emitted light from both of the front surface and the back surface of the stimulable phosphor sheet. However, in order for the detection of cross talk light due to light emitted from adjacent picture elements to be eliminated as much as possible, it is necessary for the division-into-picture-element photoelectric read-out means to be as close to the stimulable phosphor sheet as possible such that the division-into-picture-element photoelectric read-out means may not interfere with the linear stimulating ray source. From such a point of view, the division-into-picture-element photoelectric read-out means should preferably detect the emitted light from the back surface of the stimulable phosphor sheet (i.e., the surface opposite to the stimulating ray irradiation side), at which the division-into-picture-element photoelectric read-out means can be located more closely to the stimulable phosphor sheet. The surface of the stimulable phosphor sheet, from which the division-into-picture-element photoelectric read-out means detects the emitted light, should preferably be the surface, which was located on the radiation incidence side in an operation for recording the radiation image on the stimulable phosphor sheet. Specifically, in the operation for recording the radiation image on the stimulable phosphor sheet, after the radiation carrying the image information of an object has impinged upon the surface of the stimulable phosphor sheet located on the radiation incidence side, the radiation is scattered in the region inside of the stimulable phosphor sheet and thereafter goes to the other surface opposite to the radiation incidence side. Therefore, in the operation for reading out the radiation image from the stimulable phosphor sheet, if the detection of the emitted light is carried out from the surface of the stimulable phosphor sheet opposite to the radiation incidence side, a blurred signal will be obtained.

The division-into-picture-element photoelectric read-out means photoelectrically reads out the plurality of the picture elements, which have been obtained from the division of the emitted light into the picture elements, by arraying the picture elements in a two-dimensional form. Specifically, the picture elements, into which the light emitted linearly by the stimulable phosphor sheet has been divided along the length direction of the linear emitted light, i.e. along the one-dimensional direction, are photoelectrically read out by being rearranged in a two-dimensional array form.

In the first radiation image read-out apparatus in accordance with the present invention (and in the radiation image read-out and reproducing apparatus and various radiation image read-out apparatuses in accordance with the present invention, which will be described later), by way of example, the division-into-picture-element photoelectric read-out means may comprise:

a) a photoelectric conversion means, which is constituted of a plurality of photoelectric conversion devices arrayed in a two-dimensional form, b) an optical fiber bundle, which is constituted of a plurality of optical fibers, the optical fibers being bundled such that their light entry end faces may be arrayed so as to stand facing the portion (i.e., the portion of the front surface and/or the portion of the back surface) of the stimulable phosphor sheet, from which the light is emitted when it is exposed to the stimulating rays, and so as to stand in a line along the length direction of the linear portion exposed to the stimulating rays, and such that their light radiating end faces may be arrayed arbitrarily so as to respectively stand facing different photoelectric conversion devices, c) a reference table, in which a correspondence relationship between the position of each of the optical fibers in the bundle on the side of the light entry end faces and the corresponding photoelectric conversion device has been set previously, and d) a reconstruction means for reconstructing electric signal components, which have been detected by the photoelectric conversion devices, into an array that is in accordance with the array of the optical fibers on the side of the light entry end faces, the reconstruction being carried out in accordance with the correspondence relationship, which has been set in the reference table.

As will be understood from the specification, it should be noted that the term "moving a stimulable phosphor sheet with respect to a linear stimulating ray source and a photoelectric read-out means" as used herein means movement of the stimulable phosphor sheet relative to the linear stimulating ray source and the division-into-picture-element photoelectric read-out means, and embraces both the cases wherein the stimulable phosphor sheet is moved while the linear stimulating ray source and the division-into-picture-element photoelectric read-out means are kept stationary, and cases wherein the linear stimulating ray source and the division-into-picture-element photoelectric read-out means are moved while the stimulable phosphor sheet is kept stationary.

The present invention also provides an image transmission apparatus, comprising:

i) a photoelectric conversion means, which is constituted of a plurality of photoelectric conversion devices arrayed in a two-dimensional form, ii) an optical fiber bundle constituted of a plurality of optical fibers, which are bundled in a two-dimensional form on the side of their light entry end faces and in a two-dimensional form on the side of their light radiating end faces, such that the relationship between a position of each of the optical fibers in the bundle on the side of the light entry end faces and a position of the optical fiber in the bundle on the side of the light radiating end faces may become arbitrary, the light radiating end faces being located to respectively stand facing different photoelectric conversion devices, iii) a reference table, in which a correspondence relationship between the position of each of the optical fibers in the bundle on the side of the light entry end faces and the corresponding photoelectric conversion device has been set previously, and iv) a reconstruction means for reconstructing electric signal components, which have been detected by the photoelectric conversion devices, into an array that is in accordance with the array of the optical fibers on the side of the light entry end faces, the reconstruction being carried out in accordance with the correspondence relationship, which has been set in the reference table.

In cases where the image transmission apparatus in accordance with the present invention is to be utilized in order to transmit an image of an object, which lies at a position spaced apart from the light entry end faces of the optical fibers of the optical fiber bundle, to the light radiating end faces of the optical fibers (as in a medical endoscope), it is necessary for the image transmission apparatus to be further provided with an objective lens for forming the image of the object on the light entry end faces of the optical fibers, the objective lens being located at a position spaced a predetermined distance from the light entry end faces of the optical fibers.

Even if the image transmission apparatus in accordance with the present invention is not provided with the objective lens described above, the image transmission apparatus can detect the light, which is emitted by the aforesaid stimulable phosphor sheet, with the light entry end faces of the optical fibers being located at a position very close to the stimulable phosphor sheet.

As in the aforesaid first radiation image read-out apparatus in accordance with the present invention, a radiation image read-out and reproducing apparatus in accordance with the present invention is characterized by employing a linear stimulating ray source as a stimulating ray source for producing stimulating rays, which cause a stimulable phosphor sheet to emit light in proportion to the amount of energy stored thereon during its exposure to radiation, and detecting the linear light, which is emitted from a front surface and/or a back surface of the stimulable phosphor sheet, by dividing the linear light into picture elements with a photoelectric read-out means.

Specifically, the present invention further provides a radiation image read-out and reproducing apparatus, comprising:

i) an image read-out section, which comprises:
   a) a linear stimulating ray source for producing stimulating rays and linearly irradiating the stimulating rays to a portion of a stimulable phosphor sheet, on which a radiation image has been stored, the stimulating rays causing the stimulable phosphor sheet to emit light in proportion to the amount of energy stored thereon during its exposure to radiation,
   b) a photoelectric read-out means for dividing the light, which is emitted from the portion of a front surface of the stimulable phosphor sheet exposed to the stimulating rays and/or the portion of a back surface of the stimulable phosphor sheet corresponding to the portion of the front surface exposed to the stimulating rays, into a plurality of picture elements along a length direction of the portion exposed to the stimulating rays, and photoelectrically reading out the plurality of the picture elements, which have been obtained from the division of the emitted light into the picture elements, by arraying the picture elements in a two-dimensional form, and
   c) a scanning means for moving the stimulable phosphor sheet with respect to the linear stimulating ray source and the division-into-picture-element photoelectric read-out means and in a direction, which is approximately normal to the length direction of the portion exposed to the stimulating rays, ii) an image processing section for carrying out signal processing on an image signal, which represents information of the light emitted by the stimulable phosphor sheet and detected photoelectrically, and iii) an image reproducing section for reproducing a visible image, which is represented by the image signal having been obtained from the signal processing, on a recording medium and from the image signal having been obtained from the signal processing.

In the radiation image read-out and reproducing apparatus in accordance with the present invention, the recording medium should preferably be dry film, and the image reproducing section should preferably be a dry film printer. By way of example, a thermosensible recording material may be employed as the dry film, and a thermal printer provided with a thermal head device may be employed as the dry film printer.

Also, the image reproducing section may be located above the image read-out section.

A second radiation image read-out apparatus in accordance with the present invention is characterized by employing a linear stimulating ray source as a stimulating ray source for producing stimulating rays, which cause a stimulable phosphor sheet to emit light in proportion to the amount of energy stored thereon during its exposure to radiation, removing the stimulating rays mixed in the linear light, which is emitted from the portion of the stimulable phosphor sheet exposed to the stimulating rays, with a stimulating ray separation filter, and detecting the linear emitted light from a front surface and/or a back surface of the stimulable phosphor sheet by dividing the linear emitted light into picture elements with a photoelectric read-out means.

Specifically, the present invention still further provides a second radiation image read-out apparatus, comprising:

i) a linear stimulating ray source for producing stimulating rays and linearly irradiating the stimulating rays to a portion of a stimulable phosphor sheet, on which a radiation image has been stored, the stimulating rays causing the stimulable phosphor sheet to emit light in proportion to the amount of energy stored thereon during its exposure to radiation, ii) a photoelectric read-out means for dividing the light, which is emitted from the portion of a front surface of the stimulable phosphor sheet exposed to the stimulating rays (the front surface being the surface on the stimulating ray irradiation side) and/or the portion of a back surface of the stimulable phosphor sheet corresponding to the portion of the front surface exposed to the stimulating rays (the back surface being the surface opposite to the stimulating ray irradiation side), into a plurality of picture elements along a length direction of the portion exposed to the stimulating rays, and photoelectrically reading out the plurality of the picture elements, which have been obtained from the division of the emitted light into the picture elements, by arraying the picture elements in a two-dimensional form, iii) a scanning means for moving the stimulable phosphor sheet with respect to the linear stimulating ray source and the division-into-picture-element photoelectric read-out means and in a direction, which is approximately normal to the length direction of the portion exposed to the stimulating rays, and iv) a stimulating ray separation means for obstructing the passage of the stimulating rays therethrough and allowing the passage of the emitted light therethrough, the stimulating ray separation means being located between the portion of the stimulable phosphor sheet, from which the light is emitted, and the division-into-picture-element photoelectric read-out means.

In the second radiation image read-out apparatus in accordance with the present invention, the division-into-pictureelement photoelectric read-out means may comprise the aforesaid photoelectric conversion means, the aforesaid optical fiber bundle, the aforesaid reference table, and the aforesaid reconstruction means, and the stimulating ray separation means may be a stimulating ray separation filter, which is located between the light entry end faces of the optical fibers of the optical fiber bundle and the stimulable phosphor sheet. In such cases, there is the risk that the light emitted by the stimulable phosphor sheet will be scattered before the emitted light having passed through the stimulating ray separation filter impinges upon the light entry end faces of the optical fibers, and the efficiency, with which the emitted light is detected, will become low. Therefore, in such cases, the second radiation image read-out apparatus in accordance with the present invention should preferably further comprise a distributed index lens array, which is constituted of an array of a plurality of distributed index lenses and located between the stimulating ray separation filter and the stimulable phosphor sheet, each of the distributed index lenses converging the light, which is emitted from part of the stimulable phosphor sheet that stands facing the light entry end face of one of the optical fibers, and causing the converged light to enter into the one optical fiber.

The term "distributed index lens" as used herein means a lens having a refractive index distribution along the radial direction. By way of example, the distributed index lenses may be SELFOC lenses (trade name).

A third radiation image read-out apparatus in accordance with the present invention is characterized by employing a linear stimulating ray source as a stimulating ray source for producing stimulating rays, which cause a stimulable phosphor sheet to emit light in proportion to the amount of energy stored thereon during its exposure to radiation, and detecting the linear light, which is emitted from the portion of the stimulable phosphor sheet exposed to the stimulating rays, from a front surface and/or a back surface of the stimulable phosphor sheet by dividing the linear emitted light into picture elements with a photoelectric read-out means. The third radiation image read-out apparatus in accordance with the present invention is further characterized by locating a thin-film interference filter, which does not transmit the stimulating rays and transmits only the light emitted by the stimulable phosphor sheet, between the stimulable phosphor sheet and the division-into-picture-element photoelectric read-out means. The stimulating rays mixed in the emitted light is thereby removed, and the emitted light is then detected by being divided into the picture elements with the division-into-picture-element photoelectric read-out means.

Specifically, the present invention also provides a third radiation image read-out apparatus, comprising:

i) a linear stimulating ray source for producing stimulating rays and linearly irradiating the stimulating rays to a portion of a stimulable phosphor sheet, on which a radiation image has been stored, the stimulating rays causing the stimulable phosphor sheet to emit light in proportion to the amount of energy stored thereon during its exposure to radiation, ii) a photoelectric read-out means for dividing the light, which is emitted from the portion of a front surface of the stimulable phosphor sheet exposed to the stimulating rays and/or the portion of a back surface of the stimulable phosphor sheet corresponding to the portion of the front surface exposed to the stimulating rays, into a plurality of picture elements along a length direction of the portion exposed to the stimulating rays, and photoelectrically reading out the plurality of the picture elements, which have been obtained from the division of the emitted light into the picture elements, by arraying the picture elements in a two-dimensional form, iii) a scanning means for moving the stimulable phosphor sheet with respect to the linear stimulating ray source and the division-into-picture-element photoelectric read-out means and in a direction, which is approximately normal to the length direction of the portion exposed to the stimulating rays, and iv) a thin-film interference filter for obstructing the passage of the stimulating rays therethrough and allowing the passage of the emitted light therethrough, the thin-film interference filter being located between the portion of the stimulable phosphor sheet, from which the light is emitted, and the division-into-picture-element photoelectric read-out means.

In the third radiation image read-out apparatus in accordance with the present invention, the stimulating rays should preferably have wavelengths falling within the range of 633 nm to 690 nm, and the light emitted by the stimulable phosphor sheet should preferably have wavelengths falling within the range of 350 nm to 450 nm.

In order for the efficiency, with which the light emitted by the stimulable phosphor sheet is detected, to be kept high, the thin-film interference filter should preferably be located such that it may be in close contact with the division-into-picture-element photoelectric read-out means.

In the third radiation image read-out apparatus in accordance with the present invention, the division-into-picture-element photoelectric read-out means may comprise the aforesaid photoelectric conversion means, the aforesaid optical fiber bundle, the aforesaid reference table, and the aforesaid reconstruction means. In such cases, the thin-film interference filter should preferably be located between the light entry end faces of the optical fibers of the optical fiber bundle and the stimulable phosphor sheet. In order for the efficiency, with which the light emitted by the stimulable phosphor sheet is detected, to be kept high, the thin-film interference filter should more preferably be located such that it may be in close contact with the light entry end faces of the optical fibers of the optical fiber bundle.

A fourth radiation image read-out apparatus in accordance with the present invention is characterized by modifying the aforesaid third radiation image read-out apparatus in accordance with the present invention, wherein the division-into-picture-element photoelectric read-out means comprises the aforesaid photoelectric conversion means, the aforesaid optical fiber bundle, the aforesaid reference table, and the aforesaid reconstruction means, such that, in lieu of the thin-film interference filter being located between the light entry end faces of the optical fibers of the optical fiber bundle and the stimulable phosphor sheet, the thin-film interference filter may be located between the light radiating end faces of the optical fibers of the optical fiber bundle and the photoelectric conversion means.

Specifically, the present invention further provides a fourth radiation image read-out apparatus, comprising:

i) a linear stimulating ray source for producing stimulating rays and linearly irradiating the stimulating rays to a portion of a stimulable phosphor sheet, on which a radiation image has been stored, the stimulating rays causing the stimulable phosphor sheet to emit light in proportion to the amount of energy stored thereon during its exposure to radiation, ii) a photoelectric conversion means, which is constituted of a plurality of photoelectric conversion devices arrayed in a two-dimensional form, iii) an optical fiber bundle, which is constituted of a plurality of optical fibers, the optical fibers being bundled such that their light entry end faces may be arrayed so as to stand facing the portion of a front surface of the stimulable phosphor sheet, which portion is exposed to the stimulating rays and from which portion the light is emitted, and/or the portion of a back surface of the stimulable phosphor sheet, which portion corresponds to the portion of the front surface exposed to the stimulating rays and from which portion the light is emitted, and so as to stand in a line along a length direction of the linear portion exposed to the stimulating rays, and such that their light radiating end faces may be arrayed arbitrarily so as to respectively stand facing different photoelectric conversion devices, iv) a reference table, in which a correspondence relationship between the position of each of the optical fibers in the bundle on the side of the light entry end faces and the corresponding photoelectric conversion device has been set previously, v) a reconstruction means for reconstructing electric signal components, which have been detected by the photoelectric conversion devices, into an array that is in accordance with the array of the optical fibers on the side of the light entry end faces, the reconstruction being carried out in accordance with the correspondence relationship, which has been set in the reference table, vi) a scanning means for moving the stimulable phosphor sheet with respect to the linear stimulating ray source and the optical fiber bundle and in a direction, which is approximately normal to the length direction of the portion exposed to the stimulating rays, and vii) a thin-film interference filter for obstructing the passage of the stimulating rays therethrough and allowing the passage of the emitted light therethrough, the thin-film interference filter being located between the light radiating end faces of the optical fibers of the optical fiber bundle and the photoelectric conversion means.

In the fourth radiation image read-out apparatus in accordance with the present invention, in order for the efficiency, with which the light emitted by the stimulable phosphor sheet is detected, to be kept high, the thin-film interference filter should preferably be located such that it may be in close contact with the light radiating end faces of the optical fibers of the optical fiber bundle.

As will be understood from the specification, it should be noted that the term "moving a stimulable phosphor sheet with respect to a linear stimulating ray source and an optical fiber bundle" as used herein means movement of the stimulable phosphor sheet relative to the linear stimulating ray source and the optical fiber bundle, and embraces both the cases wherein the stimulable phosphor sheet is moved while the linear stimulating ray source and the optical fiber bundle are kept stationary, and cases wherein the linear stimulating ray source and the optical fiber bundle are moved while the stimulable phosphor sheet is kept stationary.

A fifth radiation image read-out apparatus in accordance with the present invention is characterized by, instead of the thin-film interference filter being used in order to separate the light emitted by the stimulable phosphor sheet and the stimulating rays from each other as in the aforesaid third or fourth radiation image read-out apparatus in accordance with the present invention, employing optical fibers, which contain a material obstructing the passage of the stimulating rays and allowing the passage of the light emitted by the stimulable phosphor sheet (e.g., a blue-color forming ionic substance, such as $Co^{2+}$ or $Cu^{2+}$), as the optical fibers of the optical fiber bundle.

Specifically, the present invention still further provides a fifth radiation image read-out apparatus, comprising:

i) a linear stimulating ray source for producing stimulating rays and linearly irradiating the stimulating rays to a portion of a stimulable phosphor sheet, on which a radiation image has been stored, the stimulating rays causing the stimulable phosphor sheet to emit light in proportion to the amount of energy stored thereon during its exposure to radiation, ii) a photoelectric conversion means, which is constituted of a plurality of photoelectric conversion devices arrayed in a two-dimensional form, iii) an optical fiber bundle, which is constituted of a plurality of optical fibers, the optical fibers being bundled such that their light entry end faces may be arrayed so as to stand facing the portion of a front surface of the stimulable phosphor sheet, which portion is exposed to the stimulating rays and from which portion the light is emitted, and/or the portion of a back surface of the stimulable phosphor sheet, which portion corresponds to the portion of the front surface exposed to the stimulating rays and from which portion the light is emitted, and so as to stand in a line along a length direction of the linear portion exposed to the stimulating rays, and such that their light radiating end faces may be arrayed arbitrarily so as to respectively stand facing different photoelectric conversion devices, iv) a reference table, in which a correspondence relationship between the position of each of the optical fibers in the bundle on the side of the light entry end faces and the corresponding photoelectric conversion device has been set previously, v) a reconstruction means for reconstructing electric signal components, which have been detected by the photoelectric conversion devices, into an array that is in accordance with the array of the optical fibers on the side of the light entry end faces, the reconstruction being carried out in accordance with the correspondence relationship, which has been set in the reference table, and vi) a scanning means for moving the stimulable phosphor sheet with respect to the linear stimulating ray source and the optical fiber bundle and in a direction, which is approximately normal to the length direction of the portion exposed to the stimulating rays, the optical fibers of the optical fiber bundle being constituted of optical fibers, which contain a material obstructing the passage of the stimulating rays and allowing the passage of the light emitted by the stimulable phosphor sheet.

A sixth radiation image read-out apparatus in accordance with the present invention is characterized by employing a linear stimulating ray source as a stimulating ray source for producing stimulating rays, which cause a stimulable phosphor sheet to emit light in proportion to the amount of energy stored thereon during its exposure to radiation, and detecting the linear light, which is emitted from the portion of the stimulable phosphor sheet exposed to the stimulating rays, from a front surface and/or a back surface of the stimulable phosphor sheet by dividing the linear emitted light into picture elements with a photoelectric read-out means and such that adverse effects of the stimulating rays mixed in the emitted light may be eliminated.

Specifically, the present invention also provides a sixth radiation image read-out apparatus, comprising:

i) a linear stimulating ray source for producing stimulating rays and linearly irradiating the stimulating rays to a portion of a stimulable phosphor sheet, on which a radiation image has been stored, the stimulating rays causing the stimulable phosphor sheet to emit light in proportion to the amount of energy stored thereon during its exposure to radiation, ii) a photoelectric read-out means for dividing the light, which is emitted from the portion of a front surface of the stimulable phosphor sheet exposed to the stimulating rays and/or the portion of a back surface of the stimulable phosphor sheet corresponding to the portion of the front surface exposed to the stimulating rays, into a plurality of picture elements along a length direction of the portion exposed to the stimulating rays, and photoelectrically reading out the plurality of the picture elements, which have been obtained from the division of the emitted light into the picture elements, by arraying the picture elements in a two-dimensional form, and iii) a scanning means for moving the stimulable phosphor sheet with respect to the linear stimulating ray source and the division-into-picture-element photoelectric read-out means and in a direction, which is approximately normal to the length direction of the portion exposed to the stimulating rays, a photoelectric converting section of the division-into-picture-element photoelectric read-out means being constituted of a material having characteristics such that the sensitivity with respect to a wavelength range of the light emitted by the stimulable phosphor sheet may be markedly higher than the sensitivity with respect to a wavelength range of the stimulating rays.

In the sixth radiation image read-out apparatus in accordance with the present invention, the sensitivity of the material, which constitutes the photoelectric converting section of the division-into-picture-element photoelectric read-out means, with respect to the wavelength range of the light emitted by the stimulable phosphor sheet is markedly higher than the sensitivity with respect to the wavelength range of the stimulating rays. Specifically, the detected intensity of the light emitted by the stimulable-phosphor sheet is higher than the detected intensity of the stimulating rays to an extent such that, when the photoelectric converting section receives the emitted light and the stimulating rays having the same level of intensity, only the emitted light may be detected substantially and the stimulating rays may not substantially constitute noise and may not adversely affect the detection of the emitted light. The material, which constitutes the photoelectric converting section of the division-into-picture-element photoelectric read-out means, should preferably have no sensitivity with respect to the wavelength range of the stimulating rays.

In the sixth radiation image read-out apparatus in accordance with the present invention, as in the aforesaid first radiation image read-out apparatus in accordance with the present invention, the division-into-picture-element photoelectric read-out means may comprise the aforesaid photoelectric conversion means (which is, in this case, provided with the photoelectric converting section), the aforesaid optical fiber bundle, the aforesaid reference table, and the aforesaid reconstruction means.

In the sixth radiation image read-out apparatus in accordance with the present invention, the stimulating rays should preferably have wavelengths falling within the range of 633 nm to 690 nm, and the light emitted by the stimulable phosphor sheet should preferably have wavelengths falling within the range of 350 nm to 450 nm.

Also, as the material, which constitutes the photoelectric converting section of the division-into-picture-element photoelectric read-out means, a gallium phosphide (GaP) type of material, typically GaP, may be employed.

A seventh radiation image read-out apparatus in accordance with the present invention is characterized by employing a linear stimulating ray source as a stimulating ray source for producing stimulating rays, which cause a stimulable phosphor sheet to emit light in proportion to the amount of energy stored thereon during its exposure to radiation, pulsed stimulating rays being produced by the linear stimulating ray source, and detecting the linear light, which is emitted with a response delay from the portion of the stimulable phosphor sheet exposed to the pulsed stimulating rays, from a front surface and/or a back surface of the stimulable phosphor sheet by dividing the linear emitted light into picture elements with a photoelectric read-out means after the completion of the exposure to the pulsed stimulating rays.

Specifically, the present invention further provides a seventh radiation image read-out apparatus, comprising:

i) a linear stimulating ray source for producing stimulating rays and linearly irradiating the stimulating rays to a portion of a stimulable phosphor sheet, on which a radiation image has been stored, the stimulating rays causing the stimulable phosphor sheet to emit light in proportion to the amount of energy stored thereon during its exposure to radiation, ii) a photoelectric read-out means for dividing the light, which is emitted from the portion of a front surface of the stimulable phosphor sheet exposed to the stimulating rays and/or the portion of a back surface of the stimulable phosphor sheet corresponding to the portion of the front surface exposed to the stimulating rays, into a plurality of picture elements along a length direction of the portion exposed to the stimulating rays, and photoelectrically reading out the plurality of the picture elements, which have been obtained from the division of the emitted light into the picture elements, by arraying the picture elements in a two-dimensional form, and iii) a scanning means for moving the stimulable phosphor sheet with respect to the linear stimulating ray source and the division-into-picture-element photoelectric read-out means and in a direction, which is approximately normal to the length direction of the portion exposed to the stimulating rays, the stimulating rays being pulsed stimulating rays, the emission time of which is shorter than a response delay time of a stimulable phosphor contained in the stimulable phosphor sheet, the response delay time being taken from when the exposure of the stimulable phosphor sheet to the stimulating rays is begun to when the intensity of the light emitted by the stimulable phosphor sheet becomes maximum, the division-into-picture-element photoelectric read-out means reading out the light, which is emitted with the response delay by the stimulable phosphor sheet, during a period after the emission of the pulsed stimulating rays is finished.

In the seventh radiation image read-out apparatus in accordance with the present invention, as in the aforesaid first radiation image read-out apparatus in accordance with the present invention, the division-into-picture-element photoelectric read-out means may comprise the aforesaid photoelectric conversion means, the aforesaid optical fiber bundle, the aforesaid reference table, and the aforesaid reconstruction means.

The response delay time of the stimulable phosphor should preferably be at least 1 μsec. Also, the stimulable phosphor should preferably contain BaFCl.

With the first radiation image read-out apparatus in accordance with the present invention, the linear stimulating ray source is employed as the stimulating ray source for producing the stimulating rays, which cause the stimulable phosphor sheet to emit light in proportion to the amount of energy stored thereon during its exposure to radiation. Also, the light, which is emitted from the portion of the stimulable phosphor sheet extending along the linear stimulating ray source, is detected from the front surface of the stimulable phosphor sheet on the same side as the linear stimulating ray source and/or the back surface of the stimulable phosphor sheet on the side opposite to the linear stimulating ray source by being divided into picture elements with the division-into-picture-element photoelectric read-out means. Therefore, the image information in the direction, along which the linear stimulating ray source extends, can be detected with respect to each of the picture elements. Further, the scanning means moves the stimulable phosphor sheet with respect to the linear stimulating ray source and the division-into-picture-element photoelectric read-out means and in the direction that is approximately normal to the direction, along which the linear stimulating ray source extends. In this manner, the image information can be read out over the entire area of the stimulable phosphor sheet.

Accordingly, with the first radiation image read-out apparatus in accordance with the present invention, it is unnecessary for a scanning optical system, which are constituted of a rotating polygon mirror, an fθ lens, and the like, to be used for the scanning of a stimulable phosphor sheet with a laser beam along a main scanning direction as in the conventional radiation image read-out apparatus. As a result, the cost of the first radiation image read-out apparatus in accordance with the present invention can be kept low, and its size can be kept small. Also, since the division-into-picture-element photoelectric read-out means is utilized, it is sufficient for a low-cost linear stimulating ray source to be employed as the stimulating ray source. Specifically, in the conventional radiation image read-out apparatus, each of picture elements is read out with a time division readout operation matched with the timing, with which the stimulable phosphor sheet is scanned with the laser beam. With the first radiation image read-out apparatus in accordance with the present invention, it is unnecessary for an expensive stimulating ray source, such as a laser beam source, to be used, and the cost of the stimulating ray source itself can be kept low.

As described above, the division-into-picture-element photoelectric read-out means may comprise:

a) the photoelectric conversion means, which is constituted of a plurality of photoelectric conversion devices arrayed in a two-dimensional form, b) the optical fiber bundle, which is constituted of a plurality of optical fibers, the optical fibers being bundled such that their light entry end faces may be arrayed so as to stand facing the portion of the stimulable phosphor sheet, from which the light is emitted when it is exposed to the stimulating rays, and so as to stand in a line along the length direction of the linear portion exposed to the stimulating rays, and such that their light radiating end faces may be arrayed arbitrarily so as to respectively stand facing different photoelectric conversion devices, c) the reference table, in which the correspondence relationship between the position of each of the optical fibers in the bundle on the side of the light entry end faces and the corresponding photoelectric conversion device has been set previously, and d) the reconstruction means for reconstructing the electric signal components, which have been detected by the photoelectric conversion devices, into an array that is in accordance with the array of the optical fibers on the side of the light entry end faces, the reconstruction being carried out in accordance with the correspondence relationship, which has been set in the reference table. In such cases, the light entry end faces of the optical fibers, which end faces stand facing the stimulable phosphor sheet, are arrayed in a line in the direction, along which the linear stimulating ray source extends. On the other hand, the light radiating end faces of the optical fibers need not necessarily be arrayed in the same order as the order, in which the light entry end faces are arrayed. Also, the light radiating end faces of the optical fibers need not necessarily be arrayed in a line and may be arrayed in one of various other forms.

Therefore, as the photoelectric conversion means, a linear photoelectric conversion means, the cost of which cannot be kept low due to the difficulty of production, need not necessarily be employed.

Accordingly, as the photoelectric conversion means, a general-purpose product, which comprises the photoelectric conversion devices arrayed in a two-dimensional form, should preferably be employed. Ordinarily, the photoelectric conversion means, such as a charge-coupled device (CCD) image sensor, which comprises the photoelectric conversion devices arrayed in a two-dimensional form, is easy to produce and is commercially available at a low cost. Also, by use of the optical fiber bundle, the linear light emitted by the stimulable phosphor sheet in the manner described above can be guided easily to the two-dimensional surface of the photoelectric conversion means.

In such cases, as for the optical fiber bundle alone, it is unnecessary to find previously the relationship between the position of each of the optical fibers in the bundle on the side of the light entry end faces and the position of the optical fiber in the bundle on the side of the light radiating end faces. Therefore, the production cost of the optical fiber bundle can be kept markedly lower than the production cost of an optical fiber bundle, which is employed in an endoscope.

Specifically, in the setting condition in which the optical fiber bundle and the photoelectric conversion means have been combined with each other, the correspondence relationship between the position of each of the optical fibers in the bundle on the side of the light entry end faces and the corresponding photoelectric conversion device in the photoelectric conversion means may be determined and set previously as the reference table. After the electric signal components have been acquired from the photoelectric conversion devices, digital rearrangement of the electric signal components may be carried out by making reference to the reference table and in accordance with the order, in which the optical fibers are arrayed on the side of the light entry end faces. In this manner, the electric signal components arrayed in accordance with the order, in which the optical fibers are arrayed linearly in the bundle on the side of the light entry end faces, can be obtained.

The correspondence relationship between the position of each of the optical fibers in the bundle on the side of the light entry end faces and the corresponding photoelectric conversion device in the photoelectric conversion means may be determined in the manner described below. Specifically, a small light spot of a laser beam, or the like, (which light spot has a beam diameter approximately equal to the diameter of each optical fiber) may be scanned along the light entry end faces of the optical fibers of the optical fiber bundle, which end faces are arrayed in a line. At this time, time series photoelectric detection results are obtained from the photoelectric conversion devices constituting the photoelectric conversion means. The aforesaid correspondence relationship may then be determined in accordance with the thus obtained time series photoelectric detection results.

Ordinarily, an image stored on a stimulable phosphor sheet is represented by an image signal, which is made up of a series of image signal components corresponding to an array of approximately 2,000 picture elements in the horizontal direction (i.e., the main scanning direction)× approximately 2,000 picture elements in the vertical direction (i.e., the sub-scanning direction). By way of example, the radiation image read-out apparatus may be constituted such that the linear stimulating ray source may extend along the main scanning direction, and such that 2,000 optical fibers corresponding to 2,000 picture elements may be located with their light entry end faces being arrayed in a line along the main scanning direction. Also, the 2,000 optical fibers may be bundled such that their light radiating end faces may be arrayed in a two-dimensional form, such as an approximately rectangular form or an approximately circular form, and light radiated out of the light radiating end faces of the 2,000 optical fibers may be detected photoelectrically by an ordinarily utilized CCD image sensor having 250,000 to 400,000 picture elements. In such cases, the number of the picture elements of the CCD image sensor, which number corresponds to a single optical fiber (or a single picture element in the image stored on the stimulable phosphor sheet), is 125 to 200 (picture elements), and the CCD image sensor thus has sufficient picture elements to spare. Therefore, an increased number of optical fibers can be utilized, and the resolution of the obtained image can thereby be enhanced.

With the image transmission apparatus in accordance with the present invention, the optical fibers are bundled such that the relationship between the position of each of the optical fibers in the bundle on the side of the light entry end faces and the position of the optical fiber in the bundle on the side of the light radiating end faces may become arbitrary. Therefore, when the light signal components, which represent an image and have entered into the optical fibers from the light entry end faces, are radiated out of the light radiating end faces, the light signal components are radiated in an order such that they may not constitute the original image. The light signal components having been radiated out of the light radiating end faces impinge upon the photoelectric conversion means, and electric image signal components are obtained from the photoelectric conversion devices, which stand facing the light radiating end faces. The electric image signal components are obtained in the order such that they may not constitute the original image. Thereafter, reference is made to the reference table, and the electric image signal components are subjected to digital rearrangement in accordance with the order, in which the optical fibers are arrayed on the side of the light entry end faces. In this manner, an image signal made up of a series of the image signal components arrayed in the order, in which the optical fibers are arrayed on the side of the light entry end faces, can be obtained. In cases where the image transmission apparatus in accordance with the present invention is further provided with an objective lens, which is located at a position spaced a predetermined distance from the light entry end faces of the optical fibers, the image transmission apparatus in accordance with the present invention can be utilized as a medical endoscope, or the like.

With the conventional medical endoscope, an image having impinged upon light entry end faces of optical fibers of an optical fiber bundle is seen as an analog image on the side of light radiating end faces of the optical fibers. Therefore, it is necessary for the optical fiber bundle to be formed such that the relationship among the spatial positions of the plurality of the optical fibers in the bundle on the side of the light entry end faces and the relationship among the spatial positions of the plurality of the optical fibers in the bundle on the side of the light radiating end faces may perfectly coincide with each other. Accordingly, the production cost of the conventional medical endoscope provided with the optical fiber bundle having such a constitution cannot be kept low. On the other hand, with the image transmission apparatus in accordance with the present invention, the production cost can be kept low.

With the radiation image read-out and reproducing apparatus in accordance with the present invention, the same effects as those with the aforesaid first radiation image read-out apparatus in accordance with the present invention can be obtained.

Also, with the radiation image read-out and reproducing apparatus in accordance with the present invention, wherein dry film is employed as the recording medium and the dry film printer is employed as the image reproducing section, the conventional processes, such as exposure, development, fixing, and drying, can be eliminated, and the processing can be kept simple.

Further, with the radiation image read-out and reproducing apparatus in accordance with the present invention, wherein the image reproducing section is located above the image read-out section, the floor area required to install the radiation image read-out and reproducing apparatus can be kept small. In cases where the dry film printer is employed as the image reproducing section, particularly large synergistic effects can be obtained. Specifically, if a conventional wet type of printer is employed as the image reproducing section and located above the image read-out section, it will be necessary to take a severe countermeasure against liquid leakage such that liquids, such as a developing solution and a fixer, may not leak into the high-accuracy image read-out section, which is located below the wet type of printer. However, in cases where the dry film printer is employed as the image reproducing section, liquid leakage need not be considered, no cost is required to take a countermeasure against liquid leakage, and the cost of the radiation image read-out and reproducing apparatus can be kept low.

With the second radiation image read-out apparatus in accordance with the present invention, the same effects as those with the aforesaid first radiation image read-out apparatus in accordance with the present invention can be obtained.

Also, with the second radiation image read-out apparatus in accordance with the present invention, wherein the stimulating ray separation means is located between the stimulable phosphor sheet and the division-into-picture-element photoelectric read-out means, the stimulating rays mixed in the light emitted by the stimulable phosphor sheet are not detected by the division-into-picture-element photoelectric read-out means, and the emitted light can be detected accurately.

Further, in the second radiation image read-out apparatus in accordance with the present invention, the optical fiber bundle described above may be employed, and the stimulating ray separation filter may be employed as the stimulating ray separation means. In such cases, the distributed index lens array comprising an array of a plurality of distributed index lenses may be located between the stimulable phosphor sheet and the stimulating ray separation filter. With the second radiation image read-out apparatus in accordance with the present invention, which is constituted in this manner, the scattering of the emitted light in the stimulating ray separation filter can be restricted, and the emitted light can be efficiently converged to the optical fibers.

With the third radiation image read-out apparatus in accordance with the present invention, the same effects as those with the aforesaid first radiation image read-out apparatus in accordance with the present invention can be obtained.

Also, with the third radiation image read-out apparatus in accordance with the present invention, wherein the thin-film interference filter is located between the stimulable phosphor sheet and the division-into-picture-element photoelectric read-out means, the problems can be prevented from occurring in that the stimulating rays mixed in the light emitted by the stimulable phosphor sheet are detected photoelectrically together with the emitted light. In cases where the thin-film interference filter is thus employed as means for separating the stimulating rays, the division-into-picture-element photoelectric read-out means can be located at a position very close to the stimulable phosphor sheet. Therefore, the problems can be prevented from occurring in that, when the spacing between the stimulable phosphor sheet and the division-into-picture-element photoelectric read-out means is large, the efficiency, with which the light emitted by the stimulable phosphor sheet is detected, becomes low due to the diffusion of the emitted light from the stimulable phosphor sheet.

With the fourth radiation image read-out apparatus in accordance with the present invention, as in the aforesaid third radiation image read-out apparatus in accordance with the present invention, wherein the division-into-picture-element photoelectric read-out means comprises the aforesaid photoelectric conversion means, the aforesaid optical fiber bundle, the aforesaid reference table, and the aforesaid reconstruction means, it is unnecessary for a scanning optical system, which are constituted of a rotating polygon mirror, an fθ lens, and the like, to be used as in the conventional radiation image read-out apparatus. As a result, the cost of the fourth radiation image read-out apparatus in accordance with the present invention can be kept low, and its size can be kept small. Also, the linear stimulating ray source may be located at a position close to the stimulable phosphor sheet, and it is unnecessary for an expensive stimulating ray source, such as a laser beam source, to be used. Therefore, the cost of the stimulating ray source itself can be kept low.

Also, with the fourth radiation image read-out apparatus in accordance with the present invention, wherein the thin-film interference filter is located between the light radiating end faces of the optical fibers of the optical fiber bundle and the photoelectric conversion means, the problems can be prevented from occurring in that the stimulating rays mixed in the light emitted by the stimulable phosphor sheet are detected photoelectrically together with the emitted light. In cases where the thin-film interference filter is thus employed as means for separating the stimulating rays, the photoelectric conversion means can be located at a position very close to the light radiating end faces of the optical fibers of the optical fiber bundle. Therefore, the problems can be prevented from occurring in that, when the spacing between the light radiating end faces of the optical fibers and the photoelectric conversion means is large, the efficiency, with which the light emitted by the stimulable phosphor sheet is detected, becomes low due to the diffusion of the emitted light from the light radiating end faces of the optical fibers.

As in the aforesaid fourth radiation image read-out apparatus in accordance with the present invention, the fifth radiation image read-out apparatus in accordance with the present invention is provided with the photoelectric conversion means, the optical fiber bundle, the reference table, and the reconstruction means. Therefore, with the fifth radiation image read-out apparatus in accordance with the present invention, it is unnecessary for a scanning optical system, which are constituted of a rotating polygon mirror, an fθ lens, and the like, to be used as in the conventional radiation image read-out apparatus. As a result, the cost of the fifth radiation image read-out apparatus in accordance with the present invention can be kept low, and its size can be kept small. Also, the linear stimulating ray source may be located at a position close to the stimulable phosphor sheet, and it is unnecessary for an expensive stimulating ray source, such as a laser beam source, to be used. Therefore, the cost of the stimulating ray source itself can be kept low.

Also, with the fifth radiation image read-out apparatus in accordance with the present invention, the optical fibers, which contain a material obstructing the passage of the stimulating rays and allowing the passage of the light emitted by the stimulable phosphor sheet (e.g., a blue-color forming ionic substance, such as $Co^{2+}$ or $Cu^{2+}$), are employed as the optical fibers of the optical fiber bundle. Therefore, the problems can be prevented from occurring in that the stimulating rays mixed in the light emitted by the stimulable phosphor sheet are detected photoelectrically together with the emitted light.

With the fifth radiation image read-out apparatus in accordance with the present invention, wherein the optical fibers themselves have the functions for separating the stimulating rays, it is unnecessary for a particular means for the separation of the stimulating rays to be located in the optical path of the light emitted by the stimulable phosphor sheet. As a result, the stimulable phosphor sheet and the light entry end faces of the optical fibers can be located such that they may be in close contact with each other. Also, the light radiating end faces of the optical fibers and the photoelectric conversion means can be located such that they may be in close contact with each other. Accordingly, the problems can be prevented from occurring in that the efficiency, with which the light emitted by the stimulable phosphor sheet is detected, becomes low due to the diffusion of the emitted light from the stimulable phosphor sheet and the diffusion of the emitted light from the light radiating end faces of the optical fibers.

With the sixth radiation image read-out apparatus in accordance with the present invention, the same effects as those with the aforesaid first radiation image read-out apparatus in accordance with the present invention can be obtained.

Also, with the sixth radiation image read-out apparatus in accordance with the present invention, the photoelectric converting section of the division-into-picture-element photoelectric read-out means is constituted of a material having the characteristics such that the sensitivity with respect to the wavelength range of the light emitted by the stimulable phosphor sheet may be markedly higher than the sensitivity with respect to the wavelength range of the stimulating rays. Therefore, substantially, the stimulating rays mixed in the light emitted by the stimulable phosphor sheet are not detected even as noise, and the intensity of only the light emitted by the stimulable phosphor sheet can be detected accurately and converted photoelectrically.

With the sixth radiation image read-out apparatus in accordance with the present invention, in cases where it is difficult for the stimulable phosphor sheet and the light entry end faces of the optical fibers to be located at positions close to each other, the stimulable phosphor sheet and the light entry end faces of the optical fibers may be spaced apart from each other, and a converging optical system may be located between them. Also, in cases where it is difficult for the light radiating end faces of the optical fibers and the photoelectric conversion means to be located at positions close to each other, the light radiating end faces of the optical fibers and the photoelectric conversion means may be spaced apart from each other, and a converging optical system may be located between them.

With the seventh radiation image read-out apparatus in accordance with the present invention, the same effects as those with the aforesaid first radiation image read-out apparatus in accordance with the present invention can be obtained.

Also, with the seventh radiation image read-out apparatus in accordance with the present invention, the stimulating rays are set to be the pulsed stimulating rays, the emission time of which is shorter than the response delay time of the stimulable phosphor contained in the stimulable phosphor sheet, the response delay time being taken from when the exposure of the stimulable phosphor sheet to the stimulating rays is begun to when the intensity of the light emitted by the stimulable phosphor sheet becomes maximum. The division-into-picture-element photoelectric read-out means does not carry out its read-out operation while the pulsed stimulating rays are being produced. The division-into-picture-element photoelectric read-out means reads out the light, which is emitted with the response delay by the stimulable phosphor sheet, during the period after the emission of the pulsed stimulating rays is finished. Therefore, it is unnecessary for particular means for removing the stimulating rays, such as a stimulating ray cut-off filter, to be used. The stimulating rays can thus be prevented from being detected, and only the light emitted by the stimulable phosphor sheet can be detected. Further, the detection of the light emitted by the stimulable phosphor sheet can be carried out accurately.

Specifically, ordinarily, the thickness of a stimulating ray cut-off filter, the thickness being taken in the direction, along which light is transmitted, is comparatively large. Therefore, when the light emitted by the stimulable phosphor sheet and serving as light signal components passes through the stimulating ray cut-off filter, the emitted light is slightly diffused. The diffusion of the emitted light will cause cross talk to occur between picture elements, and the image reproduced from an electric image signal having thus been read out will become blurred. Particularly, in cases where the read-out operation with the division into picture elements is carried out on the side of the read-out means as in the seventh radiation image read-out apparatus in accordance with the present invention, the problems concerning cross talk will readily occur. With the seventh radiation image read-out apparatus in accordance with the present invention, the extent, to which the signal-to-noise ratio can be enhanced by the elimination of the use of the stimulating ray cut-off filter, becomes higher than in the conventional radiation image read-out apparatus, wherein the scanning with the division into picture elements (spatial resolving) is carried out on the stimulating ray irradiation side.

In cases where the linear stimulating ray source is employed as the stimulating ray source and the picture elements located along a single line are stimulated simultaneously as in the seventh radiation image read-out apparatus in accordance with the present invention, the aforesaid effects of eliminating the detection of the stimulating rays by employing the pulsed stimulating rays yield very practicable effects. Specifically, for example, the response delay time of the stimulable phosphor may be 1 $\mu$sec, the time during which the pulsed stimulating rays are irradiated may be slightly shorter than 1 $\mu$sec, and the read-out operation is carried out during a period of 10 $\mu$sec immediately after the irradiation of the pulsed stimulating rays is finished. In such cases, with the seventh radiation image read-out apparatus in accordance with the present invention, wherein the picture elements located along a single line are stimulated simultaneously, the irradiation of the stimulating rays and the read-out operation with respect to the picture elements located along a single line (e.g., 2,000 picture elements) can be finished within 11 $\mu$sec, and the read-out operation for the entire image composed of 2,000 lines of picture elements can be completed within 22 seconds. Such a short read-out time is sufficiently practicable. On the other hand, with the conventional radiation image read-out apparatus, wherein the picture elements are stimulated one after another and a single line is divided into picture elements by carrying out time series detection of the light emitted from the picture elements located along the single line, the time required to carry out the irradiation of the stimulating rays and the read-out operation with respect to a single picture element is as long as 11 $\mu$sec. Further, while the read-out operation is being carried out with respect to a certain picture element lying on a line, the stimulating rays cannot be irradiated to the other picture elements lying on the same line. Therefore, the time required to carry out the irradiation of the stimulating rays and the read-out operation with respect to the picture elements located along a single line becomes as long as 22 seconds, and the time required to carry out the read-out operation for the entire image composed of 2,000 lines of picture elements becomes as long as approximately 12 hours. Such a long read-out time is not practicable.

With the seventh radiation image read-out apparatus in accordance with the present invention, in cases where it is difficult for the stimulable phosphor sheet and the light entry end faces of the optical fibers to be located at positions close to each other, the stimulable phosphor sheet and the light entry end faces of the optical fibers may be spaced apart from each other, and a converging optical system may be located between them. Also, in cases where it is difficult for the light radiating end faces of the optical fibers and the photoelectric conversion means to be located at positions close to each other, the light radiating end faces of the optical fibers and the photoelectric conversion means may be spaced apart from each other, and a converging optical system may be located between them.

BRIEF DESCRIPTION OF THE DRAWINGS

FIG. 3A is a schematic view showing the conditions, in which optical fibers of an optical fiber bundle are arrayed on the side of their light entry end faces and on the side of their light radiating end faces, FIG. 3B is a schematic view showing a different condition, in which the optical fibers of the optical fiber bundle are arrayed on the side of their light radiating end faces, FIG. 4 is an explanatory view showing the relationship between the light radiating end faces of the optical fibers and photoelectric conversion devices of a CCD image sensor 25, FIG. 11 is a graph showing spectral sensitivity characteristics of a CCD image sensor 25', FIG. 15A is a graph showing the after-glow characteristics of the stimulable phosphor, FIG. 15B is a graph showing the timing, with which a linear stimulating ray source is operated, FIG. 15C is a graph showing the timing, with which a CCD image sensor is operated, FIG. 15D is a graph showing the condition, in which a photoelectric signal is accumulated in the CCD image sensor.

DESCRIPTION OF THE PREFERRED EMBODIMENTS

The present invention will hereinbelow be described in further detail with reference to the accompanying drawings.

Figure 1A:
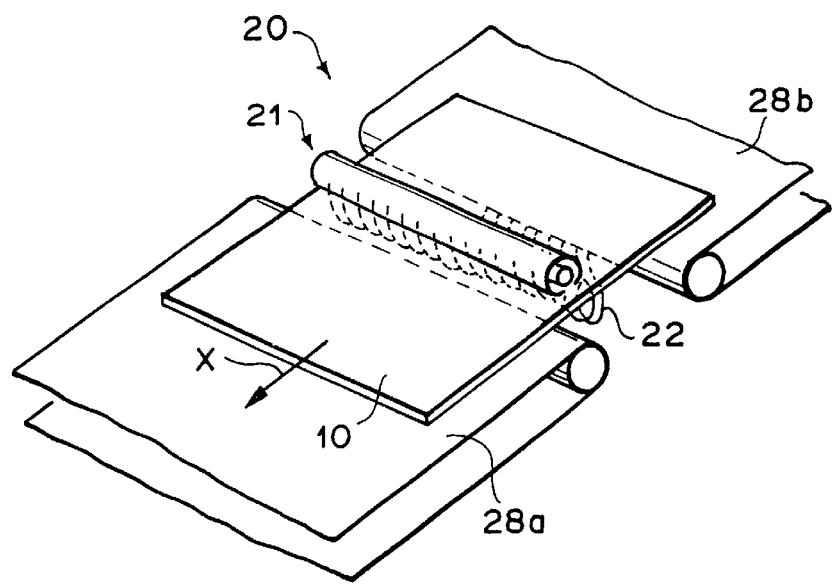
FIG. 1A is a perspective view showing an embodiment of the first radiation image read-out apparatus in accordance with the present invention.
Figure 1B:
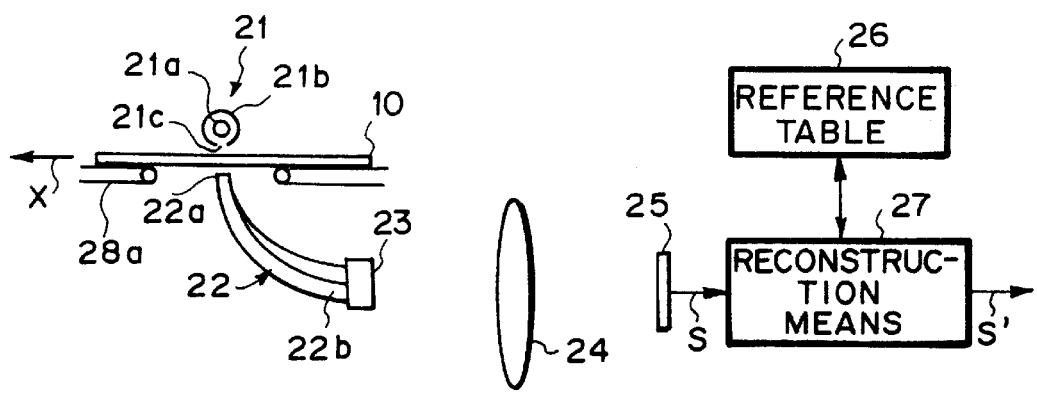
FIG. 1B is a side view showing the embodiment of FIG. 1A.
Figure 2A:
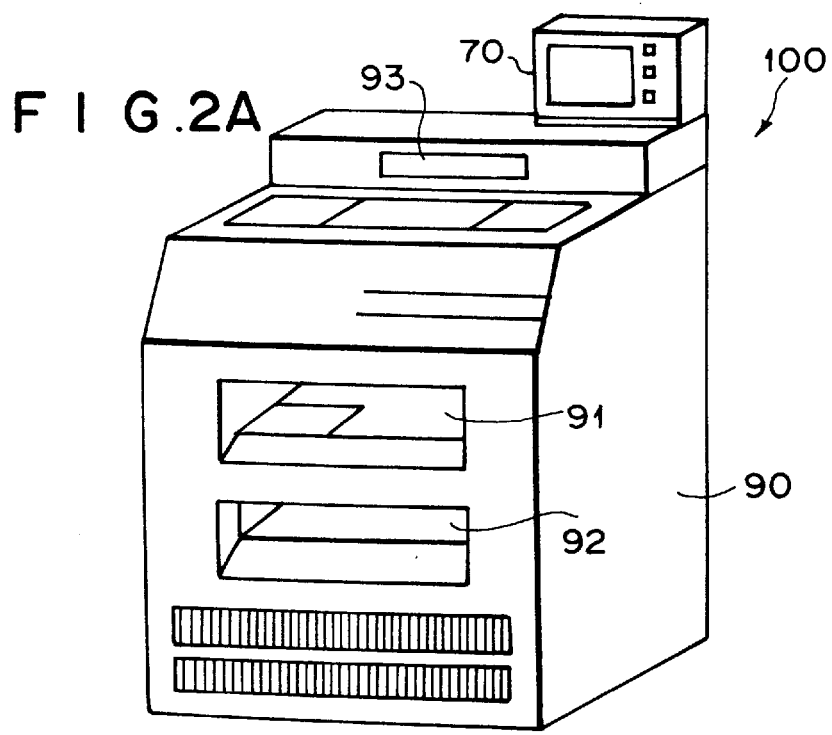
FIG. 2A is a perspective view showing a radiation image read-out and reproducing apparatus, wherein the embodiment of FIG. 1A is employed as an image read-out section.
Figure 2B:
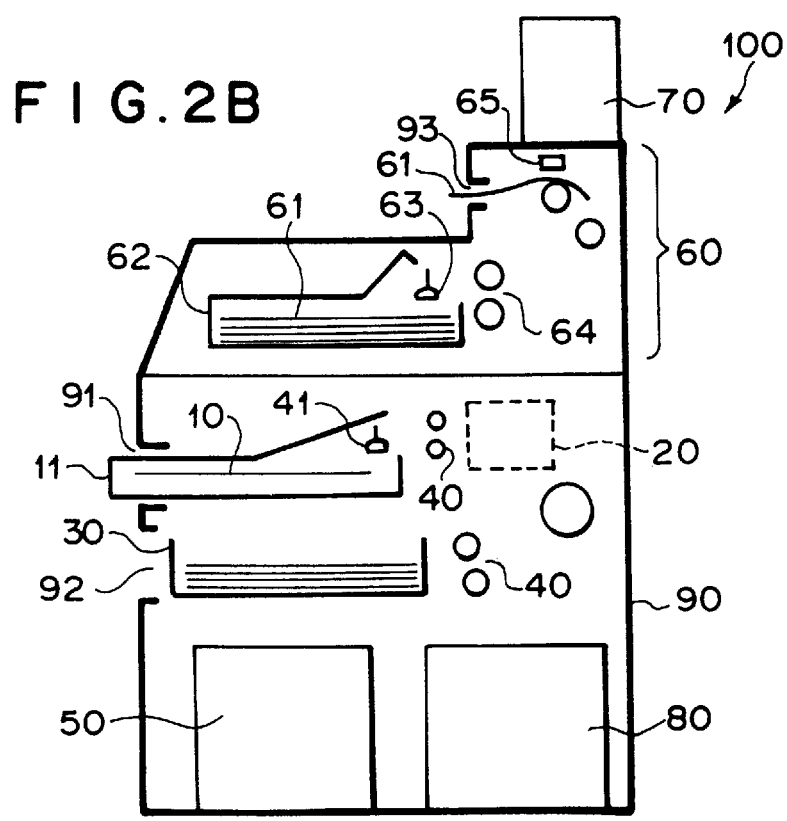
FIG. 2B is a side view showing the radiation image read-out and reproducing apparatus of FIG. 2A.

FIG. 1A is a perspective view showing an embodiment of the first radiation image read-out apparatus in accordance with the present invention. FIG. 1B is a side view showing the embodiment of FIG. 1A. FIG. 2A is a perspective view showing a radiation image read-out and reproducing apparatus, wherein the embodiment of FIG. 1A is employed as an image read-out section. FIG. 2B is a side view showing the radiation image read-out and reproducing apparatus of FIG. 2A.

With reference to FIGS. 1A and 1B, a radiation image read-out apparatus 20 comprises a linear stimulating ray source 21 extending in a direction that is approximately normal to the direction, which is indicated by the arrow X and along which a stimulable phosphor sheet (hereinbelow referred to simply as the imaging plate or IP) 10 is conveyed by conveyor belts 28a and 28b. The linear stimulating ray source 21 produces stimulating rays and irradiates the stimulating rays to the IP 10. The stimulating rays cause the IP 10 to emit light in proportion to the amount of energy stored thereon during its exposure to radiation. The radiation image read-out apparatus 20 also comprises a CCD image sensor 25, which is constituted of a plurality of photoelectric conversion devices arrayed in a two-dimensional form. (The photoelectric conversion devices correspond to an array of approximately 400,000 picture elements, i.e. an array of 632 picture elements located along the horizontal direction×632 picture elements located along the vertical direction.) The radiation image read-out apparatus 20 further comprises an optical fiber bundle 22, which is constituted of a plurality of optical fibers 22i having light entry end faces 22a, 22a, . . . and light radiating end faces 22b, 22b, . . . . The light entry end faces 22a, 22a, . . . of the optical fibers 22i stand facing a portion of a back surface of the IP 10, which portion corresponds to a portion of a front surface of the IP 10 exposed to the stimulating rays produced by the linear stimulating ray source 21. Also, the light entry end faces 22a, 22a, . . . of the optical fibers 22i are arrayed so as to stand in a line in the direction, along which the linear stimulating ray source 21 extends. The light radiating end faces 22b, 22b, . . . of the optical fibers 22i are bundled so as to spread in a two-dimensional plane. The radiation image read-out apparatus 20 still further comprises a stimulating ray cut-off filter 23, which is located at the light radiating end faces 22b, 22b, . . . of the optical fibers 22i. The radiation image read-out apparatus 20 also comprises an image forming lens 24, which is located in an optical path of light having been radiated out of the light radiating end faces 22b, 22b, . . . of the optical fibers 22i and at a position between the stimulating ray cut-off filter 23 and the CCD image sensor 25. The image forming lens 24 forms images of light signal components, which have been radiated out of the respective optical fibers 22i, upon different photoelectric conversion devices of the CCD image sensor 25. The radiation image read-out apparatus 20 further comprises a reference table 26, in which a correspondence relationship between the position of each of the optical fibers 22i in the bundle on the side of the light entry end faces 22a, 22a, . . . and the corresponding photoelectric conversion device has been set previously. The radiation image read-out apparatus 20 still further comprises a reconstruction means 27 for reconstructing electric signal components, which have been detected by the photoelectric conversion devices and constitute an image signal S, into an array that is in accordance with the array of the optical fibers 22$i$ on the side of the light entry end faces 22$a$, 22$a$, . . . . The reconstruction is carried out in accordance with the correspondence relationship, which has been set in the reference table 26. From the reconstruction, an image signal S', which is made up of a series of electric signal components having been rearranged into the array corresponding to the spatial positions on the IP 10, is obtained.

The linear stimulating ray source 21 comprises a cylindrical reflecting mirror 21$b$ and a fluorescent lamp 21$a$, which is located on the side inward from the cylindrical reflecting mirror 21$b$. The cylindrical reflecting mirror 21$b$ has a slit 21$c$ at a portion of the circumferential surface. The slit 21$c$ extends in a direction parallel to the center axis of the cylindrical reflecting mirror 21$b$. The stimulating rays, which have passed through the slit 21$c$, are irradiated as linear stimulating rays to the IP 10. In order for the degree, with which the stimulating rays radiated out of the slit 21$c$ are collected, may be kept high, a cylindrical lens having no power with respect to the direction, along which the slit 21$c$ extends, may be located along the slit 21$c$.

The stimulating ray cut-off filter 23 is set such that it may filter out the stimulating rays produced by the linear stimulating ray source 21 and may transmit the light, which is emitted by the IP 10 when the IP 10 is stimulated by the stimulating rays.

By way of example, the optical fiber bundle 22 may be constituted of 2,000 optical fibers 22$i$. Each of the optical fibers 22$i$ may have a diameter of 0.1 mm and a core ratio of 90%. As illustrated in FIG. 3A, the light entry end faces 22$a$, 22$a$, . . . of the 2,000 optical fibers 22$i$ are arrayed so as to stand in a line in parallel with the direction, along which the linear stimulating ray source 21 extends. The light radiating end faces 22$b$, 22$b$, . . . of the 2,000 optical fibers 22$i$ are bundled at random in the form shown in FIG. 3A or FIG. 3B. The distance between the back surface of the IP 10 and the light entry end faces 22$a$, 22$a$, . . . of the optical fibers 22$i$ of the optical fiber bundle 22 is set to be, for example, 0.045 mm. By way of example, as illustrated in FIG. 4, the light radiating end faces 22$b$, 22$b$, . . . of the optical fibers 22$i$ are arrayed such that the light signal components radiated out of the optical fibers 22$i$ may impinge approximately uniformly upon the photoelectric conversion surface of the CCD image sensor 25, at which the photoelectric conversion devices corresponding to approximately 400,000 picture elements are arrayed. The numerical aperture (NA) of the image forming lens 24 is 0.6, and its focal length (f) is 20 mm. The aperture ratio of the CCD image sensor 25 is 50%, and its QE is 60%. The distance between the stimulating ray cut-off filter 23 and the image forming lens 24, which distance is taken along the optical axis, is set to be 40 mm. Also, the distance between the image forming lens 24 and the CCD image sensor 25, which distance is taken along the optical axis, is set to be 40 mm. The above-enumerated values are mere examples appropriate for efficiently collecting and detecting the light emitted by the IP 10, and the first radiation image read-out apparatus in accordance with the present invention is not limited to such examples.

In this embodiment, as illustrated in FIG. 1A and FIG. 1B, the linear stimulating ray source 21 is located on one surface side of the IP 10, and the optical fiber bundle 22, and the like, are located on the other surface side of the IP 10. The constitution is employed because the light entry end faces 22$a$, 22$a$, . . . of the optical fibers 22$i$ should preferably be located at the position very close to the IP 10, such that the light emitted by the IP 10 may efficiently enter into the optical fibers 22$i$ and cross talk due to the light emitted from adjacent picture element portions may be prevented. Therefore, in cases where the efficiency, with which the emitted light is detected, can be prevented from becoming low and cross talk can be prevented efficiently, the optical fiber bundle 22, and the like, may be located on the same side as the linear stimulating ray source 21. As another alternative, the set of the linear stimulating ray source 21, the optical fiber bundle 22, and the like, may be located on one surface side of the IP 10, and another set of the linear stimulating ray source 21, the optical fiber bundle 22, and the like, may be located on the other surface side of the IP 10, such that the image read-out operation can be carried out on opposite surface sides of the IP 10.

The light radiating end faces 22$b$, 22$b$, . . . of the 2,000 optical fibers 22$i$ and the CCD image sensor 25 having 400,000 picture elements correspond to each other as illustrated in FIG. 4.

In a radiation image read-out and reproducing apparatus 100 illustrated in FIG. 2A and FIG. 2B, the radiation image read-out apparatus 20 shown in FIG. 1A and FIG. 1B is employed as an image read-out section 20. The radiation image read-out and reproducing apparatus 100 comprises the image read-out section 20 for reading out the radiation image from the IP 10, on which the radiation image has been stored, and thereby obtaining the image signal S' representing the radiation image. The radiation image read-out and reproducing apparatus 100 also comprises an image processing section 50 for carrying out signal processing, such as gradation processing or frequency processing, on the image signal S', which has been obtained from the image read-out section 20. A processed image signal S" is obtained from the signal processing. The radiation image read-out and reproducing apparatus 100 further comprises an image reproducing section 60 for reproducing a visible image P', which is represented by the processed image signal S", from the processed image signal S". The visible image P' is reproduced on dry film 61. The radiation image read-out and reproducing apparatus 100 still further comprises a CRT monitor 70, which displays the visible image P' on its display surface. The radiation image read-out and reproducing apparatus 100 also comprises a conveyance means 40 for conveying the IP 10 from a cassette 11, which has been fitted into a main body 90 of the radiation image read-out and reproducing apparatus 100, into the image read-out section 20 and an IP tray 30. The conveyance means 40 is provided with a suction means 41 for taking the IP 10 out of the cassette 11 and moving the IP 10 into the main body 90. The radiation image read-out and reproducing apparatus 100 further comprises an electric power source 80.

The electric power source 80 and the image processing section 50 are located at the lowest stage in the main body 90. The image read-out section 20 is located above the electric power source 80 and the image processing section 50, and the image reproducing section 60 is located above the image read-out section 20. Therefore, when the operator operates the radiation image read-out and reproducing apparatus 100 while he is in a standing posture, the dry film 61, on which the visible image has been reproduced, is discharged from the main body 90 to a position at a height that is appropriate for the operator to see the visible image.

The image reproducing section 60 constituted as the dry film printer carries out thermosensitive recording on the dry film 61, i.e. the thermosensible cut-sheet recording material. The dry film printer 60 comprises a conveyance means 64, which is provided with a sheet feeding means 63. The sheet feeding means 63 takes a plurality of sheets of dry film 61, which have been accommodated in a releasably loaded magazine 62, one after another out of the magazine 62 and conveys the dry film 61 into the dry film printer 60. The dry film printer 60 also comprises a thermal head device 65 for carrying out the thermosensitive recording on the dry film 61. Though not shown in detail, the thermal head device 65 comprises a thermal head main body constituted of a substrate, on which a graze portion for carrying out the image recording on the thermosensible surface of the thermosensible recording material. The thermal head device 65 also comprises a heat sink, which serves as a cooling means and is secured directly to the thermal head main body, and a cooling fan, which constitutes the cooling means in cooperation with the heat sink. The thermal head device 65 further comprises a surface heater for heating the thermal head main body, and a control means for controlling the cooling fan and the surface heater.

How the radiation image read-out and reproducing apparatus 100 operates will be described hereinbelow.

The IP tray 30 is fitted into a tray fitting opening 92 of the main body 90, and the cassette 11 accommodating the IP 10, on which a radiation image of a patient has been stored, is fitted into a cassette fitting opening 91. As illustrated in FIG. 2B, a cover member of the cassette 11 is then opened, and the suction means 41 takes the IP 10 out of the cassette 11, the cover member of which has been opened, and moves the IP 10 into the main body 90. The IP 10 is then conveyed by the conveyance means 40 into the image read-out section 20.

In the image read-out section 20, the IP 10 is set on the two conveyor belts 28a and 28b and conveyed in the direction indicated by the arrow X. While the IP 10 is being thus conveyed, the front surface of the IP 10 (the upper surface in FIG. 1B) is exposed linearly to the stimulating rays, which are produced by the linear stimulating ray source 21. When the linear portion of the IP 10 is exposed to the stimulating rays, it emits light in proportion to the amount of energy stored thereon during its exposure to radiation.

At this time, the light is emitted from the front surface and the back surface of the IP 10. As described above, the light entry end faces 22a, 22a, . . . of the optical fibers 22i constituting the optical fiber bundle 22 are located at the position close to the back surface of the IP 10. The light, which has thus been emitted from each of small portions of the back surface of the IP 10, enters from one of the light entry end faces 22a, 22a, . . . , which is located at the position corresponding to the small portion of the back surface, into the corresponding optical fiber 22i. In this manner, the linear light, which has been emitted from the portion of the IP 10 exposed to the linear stimulating rays having been produced by the linear stimulating ray source 21, is divided into the light signal components corresponding to 2,000 picture elements, the number of which is equal to the number of the optical fibers 22i.

The light signal components corresponding to the respective picture elements are guided through the optical fibers 22i by repeating total reflection and up to the light radiating end faces 22b, 22b, . . . . The light signal components are then radiated out of the light radiating end faces 22b, 22b, . . . . At this time, since the stimulating ray cut-off filter 23 is located at the light radiating end faces 22b, 22b, . . . , even if the stimulating rays have been mixed in the light signal components of the emitted light, the stimulating rays can be removed from the light signal components of the emitted light.

The light signal components, which have passed through the stimulating ray cut-off filter 23, become diffused slightly. However, the images of the light signal components can be formed on the photo detection surface of the CCD image sensor 25 by the image forming lens 24. In cases where the light radiating end faces 22b, 22b, . . . of the optical fiber bundle 22 are bundled in the form illustrated in FIG. 3A, the images of the light signal components are formed in the pattern illustrated in FIG. 4 on the photo detection surface (the surfaces of the photoelectric conversion devices) of the CCD image sensor 25.

On the side of the light radiating end faces 22b, 22b, . . . , the optical fibers 22i of the optical fiber bundle 22 are bundled at random. Therefore, it is not clear at which position in the bundle on the side of the light entry end faces 22a, 22a, . . . a certain optical fiber specified on the side of the light radiating end faces 22b, 22b, is located. Accordingly, it is necessary to find previously the correspondence relationship between the position of each of the optical fibers 22i in the bundle on the side of the light entry end faces 22a, 22a, . . . and the position of the optical fiber in the bundle on the side of the light radiating end faces 22b, 22b, . . . . For such purposes, in this embodiment, light is irradiated successively to the light entry end faces 22a, 22a, . . . of the optical fibers 22i, and it is investigated from which light radiating end face 22b the light is radiated. The investigation is made in accordance with the detection signal component obtained from the CCD image sensor 25. The thus found correspondence relationship between the position of each of the optical fibers 22i in the bundle on the side of the light entry end faces 22a, 22a, . . . and the position of the optical fiber in the bundle on the side of the light radiating end faces 22b, 22b, . . . (i.e. the correspondence relationship between the position of each of the optical fibers 22i in the bundle on the side of the light entry end faces 22a, 22a, . . . and the corresponding photoelectric conversion device in the CCD image sensor 25) is tabulated as the reference table 26. When an image read-out operation is thereafter carried out, the reconstruction means 27 rearranges the detection signal components, which are obtained from the respective photoelectric conversion devices in the CCD image sensor 25, by making reference to the reference table 26 and in accordance with the order, in which the optical fibers 22i are arrayed in the optical fiber bundle 22 on the side of the light entry end faces 22a, 22a, . . . .

In this manner, the image signal S', which is made up of a series of electric signal components having been rearranged into the array corresponding to the spatial positions on the IP 10, can be obtained. The obtained image signal S' is fed into the image processing section 50.

The image processing section 50 carries out various kinds of image processing on the received image signal S', and a processed image signal S" is thereby obtained. The processed image signal S" is fed into the image reproducing section 60 and the CRT monitor 70.

The IP 10, from which the image signal has been detected in the image read-out section 20, is conveyed by the conveyance means 40 into the IP tray 30. An erasing section may be located in the conveyance path between the image read-out section 20 and the IP tray 30. In the erasing section, the IP 10, from which the image signal has been detected in the image read-out section 20, is exposed to erasing light, and energy remaining on the IP 10 is thereby released approximately perfectly.

The IP tray 30 is capable of accommodating a plurality of IPs 10, 10, . . . , and therefore it is kept in the radiation image read-out and reproducing apparatus 100 until a predetermined number of the IPs 10, 10, . . . , from which the image signals have been detected, are accommodated in it. After the predetermined number of the IPs 10, 10, . . . have been accommodated in the IP tray 30, the IP tray 30 is taken out of the radiation image read-out and reproducing apparatus 100. The IPs 10, 10, . . . are then discharged from the IP tray 30, and the IP tray 30, which is now empty, is again fitted into the radiation image read-out and reproducing apparatus 100.

The CRT monitor 70 reproduces a visible image from the processed image signal S", which has been received from the image processing section 50. The visible image is displayed on the display surface of the CRT monitor 70. The operator sees the displayed visible image and makes a judgment as to whether the degree or the range of the signal processing, or the like, is or is not to be altered.

In the image reproducing section 60 constituted as the dry film printer, the sheet feeding means 63 takes the plurality of sheets of dry film 61, which have been accommodated in the magazine 62, one after another out of the magazine 62 and conveys the dry film 61 into the dry film printer 60. The conveyance means 64 conveys the dry film 61 to the thermal head device 65, and the thermal head device 65 carries out the thermosensitive recording of a visible image on the dry film 61 in accordance with the processed image signal S", which is received from the image processing section 50. Specifically, in the thermosensitive recording step, the control means controls the cooling fan and the surface heater, the temperature of the thermal head main body is thereby adjusted, and a gray level image is thereby recorded on the dry film 61.

The dry film 61, on which the visible image has been reproduced, is discharged from the radiation image read-out and reproducing apparatus 100 through a film discharging opening 93. The position of the film discharging opening 93 is set such that, when the operator operates the radiation image read-out and reproducing apparatus 100 while he is in the standing posture, the dry film 61, on which the visible image has been reproduced, may be discharged to the position at a height that is appropriate for the operator to see the visible image. Therefore, for example, a failure to take up the discharged dry film can be prevented.

As described above, with this embodiment of the radiation image read-out and reproducing apparatus 100, it is unnecessary to use high-cost devices, such as a conventional laser beam source, a laser beam scanning system, and a photomultiplier, as in the conventional radiation image read-out and reproducing apparatus, and the light emitted by the IP 10 can be separated into light signal components corresponding to the picture elements. Therefore, the production cost of the radiation image read-out and reproducing apparatus 100 can be kept markedly lower than the production cost of the conventional radiation image read-out and reproducing apparatus. Accordingly, the radiation image read-out and reproducing apparatus 100 can be furnished at a low cost and can be utilized popularly.

Figure 5:
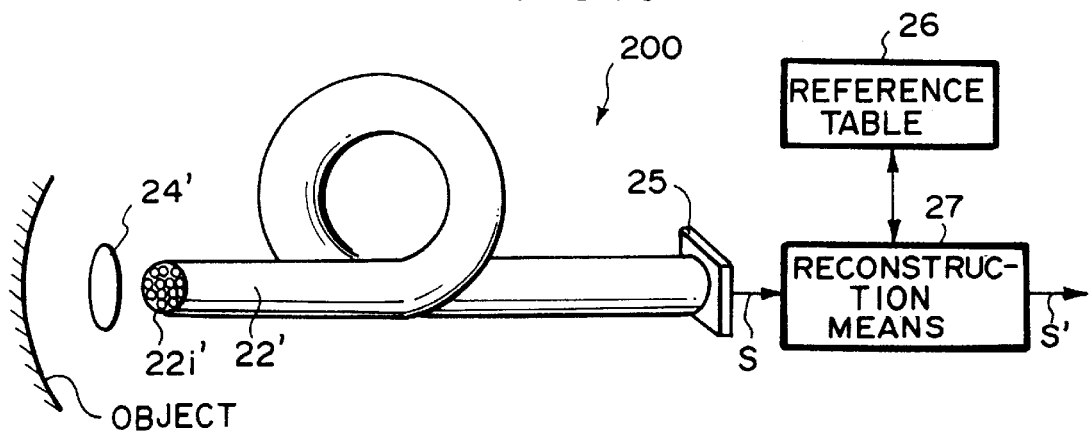
FIG. 5 is a schematic view showing an embodiment of the image transmission apparatus in accordance with the present invention.

FIG. 5 is a schematic view showing an embodiment of the image transmission apparatus in accordance with the present invention.

With reference to FIG. 5, an image transmission apparatus 200 is constituted for use as a medical endoscope, or the like. The image transmission apparatus 200 comprises the CCD image sensor 25, which is constituted of a plurality of photoelectric conversion devices arrayed in a two-dimensional form. The image transmission apparatus 200 also comprises an optical fiber bundle 22' constituted of a plurality of optical fibers 22i', which are bundled in a two-dimensional form on the side of their light entry end faces and in a two-dimensional form on the side of their light radiating end faces, such that the relationship between a position of each of the optical fibers 22i' in the bundle on the side of the light entry end faces and a position of the optical fiber in the bundle on the side of the light radiating end faces may become arbitrary. The light radiating end faces are located to respectively stand facing different photoelectric conversion devices. The image transmission apparatus 200 further comprises the reference table 26, in which a correspondence relationship between the position of each of the optical fibers 22i' in the bundle on the side of the light entry end faces and the corresponding photoelectric conversion device has been set previously. The image transmission apparatus 200 still further comprises the reconstruction means 27 for reconstructing electric signal components, which have been detected by the photoelectric conversion devices, into an array that is in accordance with the array of the optical fibers 22i' on the side of the light entry end faces. The reconstruction is carried out in accordance with the correspondence relationship, which has been set in the reference table 26. The image transmission apparatus 200 also comprises an objective lens 24' for forming an image of an object on the light entry end faces of the optical fibers 22i', the objective lens being located at a position spaced a predetermined distance from the light entry end faces of the optical fibers 22i'.

With the image transmission apparatus 200, an image of light, which has been irradiated to the object and reflected from the object (i.e., the light carrying image information of the object), is formed on the light entry end faces of the optical fibers 22i' by the objective lens 24'. The light signal components of the formed image, which represent picture elements corresponding to the optical fibers 22i' constituting the optical fiber bundle 22', enter from the light entry end faces of the optical fibers 22i', pass through the optical fibers 22i', and are radiated out of the light radiating end faces.

As described above, the optical fibers 22i' are bundled such that the relationship among the spatial positions of the optical fibers 22i' in the bundle on the side of the light entry end faces and the relationship among the spatial positions of the optical fibers 22i' in the bundle on the side of the light radiating end faces may not coincide with each other. Therefore, an image, which is constituted of the light signal components radiated out of the light radiating end faces of the optical fibers 22i', is quite different from the original image of the object.

The light signal components, which have been radiated out of the light radiating end faces of the optical fibers 22i', impinge upon the CCD image sensor 25. At this time, the light signal components, which have been radiated out of the optical fibers 22i', impinge upon different photoelectric conversion devices, which constitute the CCD image sensor 25.

Each of the photoelectric conversion devices generates an electric signal component in accordance with the amount of light detected through the photoelectric conversion. The reconstruction means 27 rearranges the detection signal components, which are obtained from the respective photoelectric conversion devices in the CCD image sensor 25, by making reference to the reference table 26 and in accordance with the order, in which the optical fibers 22i' are arrayed in the optical fiber bundle 22' on the side of the light entry end faces.

In this manner, the image signal S', which is made up of a series of electric signal components having been rearranged into the array corresponding to the spatial positions on the object, can be obtained.

Figure 6:
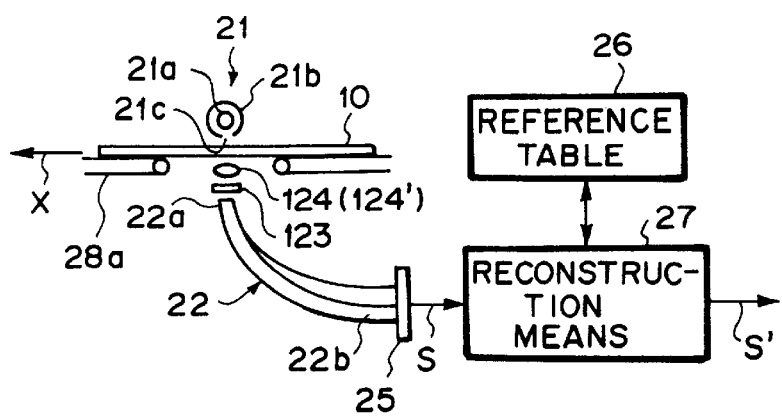
FIG. 6 is a side view showing an embodiment of the second radiation image read-out apparatus in accordance with the present invention.

An embodiment of the second radiation image read-out apparatus in accordance with the present invention will be described hereinbelow with reference to FIG. 6. In FIG. 6 (and those that follow), similar elements are numbered with the same reference numerals with respect to FIG. 1A and FIG. 1B.

As in the radiation image read-out apparatus 20 illustrated in FIG. 1A and FIG. 1B, a radiation image read-out apparatus 20 illustrated in FIG. 6 is provided with the linear stimulating ray source 21 extending in the direction that is approximately normal to the direction, which is indicated by the arrow X and along which the IP 10 is conveyed by the conveyor belts 28a and 28b. The linear stimulating ray source 21 produces the stimulating rays and irradiates the stimulating rays to the IP 10. The stimulating rays cause the IP 10 to emit light in proportion to the amount of energy stored thereon during its exposure to radiation. The radiation image read-out apparatus 20 also comprises the CCD image sensor 25, which is constituted of a plurality of photoelectric conversion devices arrayed in a two-dimensional form. (The photoelectric conversion devices correspond to an array of approximately 400,000 picture elements, i.e. an array of 632 picture elements located along the horizontal direction×632 picture elements located along the vertical direction.) The radiation image read-out apparatus 20 further comprises the optical fiber bundle 22, which is constituted of a plurality of the optical fibers 22i having the light entry end faces 22a, 22a, . . . and the light radiating end faces 22b, 22b, . . . . The light entry end faces 22a, 22a, . . . of the optical fibers 22i stand facing a portion of the back surface of the IP 10, which portion corresponds to a portion of the front surface of the IP 10 exposed to the stimulating rays produced by the linear stimulating ray source 21. Also, the light entry end faces 22a, 22a, . . . of the optical fibers 22i are arrayed so as to stand in a line in the direction, along which the linear stimulating ray source 21 extends. The light radiating end faces 22b, 22b, . . . of the optical fibers 22i are bundled so as to spread in a two-dimensional plane and are located to stand facing the light receiving surface of the CCD image sensor 25. The radiation image read-out apparatus 20 still further comprises a stimulating ray separation filter 123, which is located at the light entry end faces 22a, 22a, . . . of the optical fibers 22i. The radiation image read-out apparatus 20 also comprises a distributed index lens array 124', which is constituted of an array of a plurality of distributed index lenses 124, 124, . . . and located between the stimulating ray separation filter 123 and the IP 10. The plurality of the distributed index lenses 124, 124, . . . are arrayed in the direction, along which the linear stimulating ray source 21 extends. Each of the distributed index lenses 124, 124, . . . converges the light, which is emitted from part of the IP 10 that stands facing the light entry end face 22a of one of the optical fibers 22i, and causes the converged light to enter into the optical fiber. The radiation image read-out apparatus 20 further comprises the reference table 26, in which the correspondence relationship between the position of each of the optical fibers 22i in the bundle on the side of the light entry end faces 22a, 22a, . . . and the corresponding photoelectric conversion device has been set previously. The radiation image read-out apparatus 20 still further comprises the reconstruction means 27 for reconstructing the electric signal components, which have been detected by the photoelectric conversion devices and constitute an image signal S, into an array that is in accordance with the array of the optical fibers 22i on the side of the light entry end faces 22a, 22a, . . . . The reconstruction is carried out in accordance with the correspondence relationship, which has been set in the reference table 26. From the reconstruction, an image signal S', which is made up of a series of electric signal components having been rearranged into the array corresponding to the spatial positions on the IP 10, is obtained.

The stimulating ray separation filter 123 is set such that it may filter out the stimulating rays produced by the linear stimulating ray source 21 and may transmit the light, which is emitted by the IP 10 when the IP 10 is stimulated by the stimulating rays.

As the distributed index lenses 124, 124, constituting the distributed index lens array 124', by way of example, the SELFOC lenses (trade name) are employed.

The CCD image sensor 25 is located at a position very close to the light radiating end faces 22b, 22b, of the optical fibers 22i, such that the light signal components radiated out of the optical fibers 22i may impinge approximately uniformly upon the photoelectric conversion surface of the CCD image sensor 25, at which the photoelectric conversion devices corresponding to approximately 400,000 picture elements are arrayed. The aperture ratio of the CCD image sensor 25 is 50%, and its QE is 60%. The above-enumerated values are mere examples appropriate for efficiently collecting and detecting the light emitted by the IP 10, and the second radiation image read-out apparatus in accordance with the present invention is not limited to such examples.

Also, in the embodiment of FIG. 6, in cases where the efficiency, with which the emitted light is detected, can be prevented from becoming low and cross talk can be prevented efficiently, the optical fiber bundle 22, and the like, may be located on the same side as the linear stimulating ray source 21. As another alternative, the set of the linear stimulating ray source 21, the optical fiber bundle 22, and the like, may be located on one surface side of the IP 10, and another set of the linear stimulating ray source 21, the optical fiber bundle 22, and the like, may be located on the other surface side of the IP 10, such that the image read-out operation can be carried out on opposite surface sides of the IP 10.

As in the radiation image read-out apparatus 20 illustrated in FIG. 1A and FIG. 1B, the radiation image read-out apparatus 20 of FIG. 6 can be incorporated as the image read-out section 20 in the radiation image read-out and reproducing apparatus 100 illustrated in FIG. 2A and FIG. 2B. In the image read-out section 20, the light is emitted from the front surface and the back surface of the IP 10. Also, of the stimulating rays, which have been irradiated to the front surface of the IP 10, a portion having passed through the IP 10 is radiated out of the back surface of the IP 10. The light, which has thus been emitted from each of small portions of the back surface of the IP 10, and the portion of the stimulating rays, which is radiated out of the back surface of the IP 10, impinge upon the corresponding SELFOC lens 124 and are converged by the SELFOC lens 124 so as to form a converged spot on one of the light entry end faces 22a, 22a, of the optical fibers 22i. The emitted light and the portion of the stimulating rays, which are thus converged, impinge upon the stimulating ray separation filter 123.

The stimulating ray separation filter 123 filters out the stimulating rays and transmits only the light emitted by the IP 10. When the emitted light passes through the stimulating ray separation filter 123, it is diffused slightly. However, since the emitted light has been converged by the SELFOC lens 124, it impinges upon one of the light entry end faces 22a, 22a, . . . of the optical fibers 22i without being lost largely due to diffusion. With the effects described above, only the emitted light, from which the stimulating rays have been filtered out, can be collected efficiently onto one of the light entry end faces 22a, 22a, . . . and can be guided into the corresponding optical fiber 22i. In this manner, the linear light, which has been emitted from the portion of the IP 10 exposed to the linear stimulating rays having been produced by the linear stimulating ray source 21, is divided into the light signal components corresponding to 2,000 picture elements, the number of which is equal to the number of the optical fibers 22i.

The light signal components corresponding to the respective picture elements are guided through the optical fibers 22i by repeating total reflection and up to the light radiating end faces 22b, 22b, . . . . The light signal components are then radiated out of the light radiating end faces 22b, 22b, . . . and guided to the photo detection surface of the CCD image sensor 25, which is located at the position close to the light radiating end faces 22b, 22b, of the optical fibers 22i. In cases where the light radiating end faces 22b, 22b, . . . of the optical fiber bundle 22 are bundled in the form illustrated in FIG. 3A, the images of the light signal components are formed in the pattern illustrated in FIG. 4 on the photo detection surface (the surfaces of the photoelectric conversion devices) of the CCD image sensor 25.

As described above, with the radiation image read-out and reproducing apparatus 100, wherein the radiation image read-out apparatus 20 of FIG. 6 is employed as the image read-out section, it is unnecessary to use high-cost devices, such as a conventional laser beam source, a laser beam scanning system, and a photomultiplier, as in the conventional radiation image read-out and reproducing apparatus, and the light emitted by the IP 10 can be separated into light signal components corresponding to the picture elements. Therefore, the production cost of the radiation image read-out and reproducing apparatus 100 can be kept markedly lower than the production cost of the conventional radiation image read-out and reproducing apparatus. Accordingly, the radiation image read-out and reproducing apparatus 100 can be furnished at a low cost and can be utilized popularly.

An embodiment of the third radiation image read-out apparatus in accordance with the present invention will be described hereinbelow with reference to FIG. 7.

Figure 7:
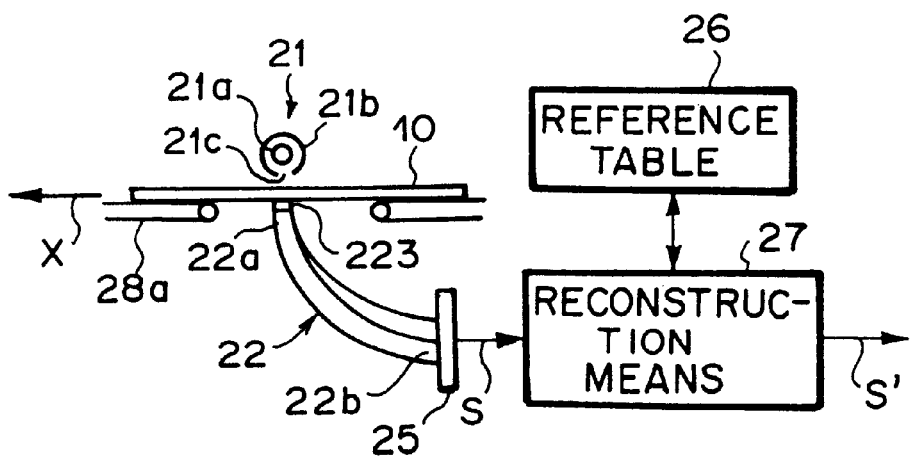
FIG. 7 is a side view showing an embodiment of the third radiation image read-out apparatus in accordance with the present invention.

As in the radiation image read-out apparatus 20 illustrated in FIG. 1A and FIG. 1B, a radiation image read-out apparatus 20 illustrated in FIG. 7 is provided with the linear stimulating ray source 21 extending in the direction that is approximately normal to the direction, which is indicated by the arrow X and along which the IP 10 is conveyed by the conveyor belts 28 and 28b. The linear stimulating ray source 21 produces the stimulating rays and irradiates the stimulating rays to the IP 10. The stimulating rays cause the IP 10 to emit light in proportion to the amount of energy stored thereon during its exposure to radiation. The radiation image read-out apparatus 20 also comprises the CCD image sensor 25, which is constituted of a plurality of photoelectric conversion devices arrayed in a two-dimensional form. (The photoelectric conversion devices correspond to an array of approximately 400,000 picture elements, i.e. an array of 632 picture elements located along the horizontal direction×632 picture elements located along the vertical direction.) The radiation image read-out apparatus 20 further comprises the optical fiber bundle 22, which is constituted of a plurality of the optical fibers 22i having the light entry end faces 22a, 22a, . . . and the light radiating end faces 22b, 22b, . . . . The light entry end faces 22a, 22a, . . . of the optical fibers 22i are located such that they may be very close to a portion of the back surface of the IP 10, which portion corresponds to a portion of the front surface of the IP 10 exposed to the stimulating rays produced by the linear stimulating ray source 21. Also, the light entry end faces 22a, 22a, of the optical fibers 22i are arrayed so as to stand in a line in the direction, along which the linear stimulating ray source 21 extends. The light radiating end faces 22b, 22b, . . . of the optical fibers 22i are bundled so as to spread in a two-dimensional plane and are located such that they may be approximately in close contact with the light receiving surface of the CCD image sensor 25. The radiation image read-out apparatus 20 still further comprises a thin-film interference filter 223, which is formed directly on the light entry end faces 22a, 22a, . . . of the optical fibers 22i. The radiation image read-out apparatus 20 also comprises the reference table 26, in which the correspondence relationship between the position of each of the optical fibers 22i in the bundle on the side of the light entry end faces 22a, 22a, . . . and the corresponding photoelectric conversion device has been set previously. The radiation image read-out apparatus 20 further comprises the reconstruction means 27 for reconstructing the electric signal components, which have been detected by the photoelectric conversion devices and constitute an image signal S, into an array that is in accordance with the array of the optical fibers 22i on the side of the light entry end faces 22a, 22a, . . . . The reconstruction is carried out in accordance with the correspondence relationship, which has been set in the reference table 26. From the reconstruction, an image signal S', which is made up of a series of electric signal components having been rearranged into the array corresponding to the spatial positions on the IP 10, is obtained.

The thin-film interference filter 223 has the spectral characteristics such that it may obstruct the passage of the stimulating rays produced by the linear stimulating ray source 21 and may allow the passage of the light, which is emitted by the IP 10 when the IP 10 is stimulated by the stimulating rays. The thin-film interference filter 223 is formed directly on the light entry end faces 22a, 22a, . . . of the optical fibers 22i constituting the optical fiber bundle 22. The optical fiber bundle 22 is located such that the light entry end faces 22a, 22a, . . . may be very close to the back surface of the IP 10 with the thin-film interference filter 223 intervening therebetween.

The CCD image sensor 25 is approximately in close contact with the light radiating end faces 22b, 22b, of the optical fibers 22i and is located such that the light signal components radiated out of the optical fibers 22i may impinge approximately uniformly upon the photoelectric conversion surface of the CCD image sensor 25, at which the photoelectric conversion devices corresponding to approximately 400,000 picture elements are arrayed. The aperture ratio of the CCD image sensor 25 is 50%, and its QE is 60%. The above-enumerated values are mere examples appropriate for efficiently collecting and detecting the light emitted by the IP 10, and the third radiation image read-out apparatus in accordance with the present invention is not limited to such examples.

Also, in the embodiment of FIG. 7, in cases where the light entry end faces 22a, 22a, . . . of the optical fibers 22i can be located such that they may be very close to the IP 10, the optical fiber bundle 22, and the like, may be located on the same side as the linear stimulating ray source 21, and the light entry end faces 22a, 22a, of the optical fiber bundle 22 may be located such that they may be very close to the surface of the IP 10. As another alternative, the set of the linear stimulating ray source 21, the optical fiber bundle 22, and the like, maybe located on one surface side of the IP 10, and another set of the linear stimulating ray source 21, the optical fiber bundle 22, and the like, may be located on the other surface side of the IP 10, such that the image read-out operation can be carried out on opposite surface sides of the IP 10.

As in the radiation image read-out apparatus 20 illustrated in FIG. 1A and FIG. 1B, the radiation image read-out apparatus 20 of FIG. 7 can be incorporated as the image read-out section 20 in the radiation image read-out and reproducing apparatus 100 illustrated in FIG. 2A and FIG. 2B. In the image read-out section 20, the light is emitted from the front surface and the back surface of the IP 10. Also, a portion of the stimulating rays, which have been irradiated to the front surface of the IP 10, is radiated out of each of the front surface and the back surface of the IP 10. Specifically, the stimulating rays, which have been reflected from the front surface of the IP 10, are radiated out of the front surface of the IP 10. Also, the stimulating rays, which have passed through the IP 10, are radiated out of the back surface of the IP 10.

The light, which has thus been emitted from each of small portions of the back surface of the IP 10, and the portion of the stimulating rays, which is radiated out of the back surface of the IP 10, impinge upon the thin-film interference filter 223. Thereafter, the light emitted from each of small portions of the back surface of the IP 10 impinges upon one of the light entry end faces 22a, 22a, . . . of the optical fibers 22i.

Of the emitted light and the stimulating rays, which are radiated out of the back surface of the IP 10, the passage of the stimulating rays are obstructed by the thin-film interference filter 223, and the passage of only the emitted light is allowed by the thin-film interference filter 223. Therefore, only the emitted light enters into each of the optical fibers 22i.

The linear light, which has been emitted from the portion of the IP 10 exposed to the linear stimulating rays having been produced by the linear stimulating ray source 21, is divided into the light signal components corresponding to 2,000 picture elements, the number of which is equal to the number of the optical fibers 22i.

The light signal components corresponding to the respective picture elements are guided through the optical fibers 22i by repeating total reflection and up to the light radiating end faces 22b, 22b, . . . . The light signal components are then radiated out of the light radiating end faces 22b, 22b, . . . and guided to the photo detection surface of the CCD image sensor 25, which is located such that it may be in close contact with the light radiating end faces 22b, 22b, . . . of the optical fibers 22i. In cases where the light radiating end faces 22b, 22b, of the optical fiber bundle 22 are bundled in the form illustrated in FIG. 3A, the optical fibers 22i correspond to the positions on the photo detection surface (the surfaces of the photoelectric conversion devices) of the CCD image sensor 25 in the pattern illustrated in FIG. 4.

As described above, with the radiation image read-out and reproducing apparatus 100, wherein the radiation image read-out apparatus 20 of FIG. 7 is employed as the image read-out section, it is unnecessary to use high-cost devices, such as a conventional laser beam source, a laser beam scanning system, and a photomultiplier, as in the conventional radiation image read-out and reproducing apparatus, and the light emitted by the IP 10 can be separated into light signal components corresponding to the picture elements.

Therefore, the production cost of the radiation image read-out and reproducing apparatus 100 can be kept markedly lower than the production cost of the conventional radiation image read-out and reproducing apparatus. Accordingly, the radiation image read-out and reproducing apparatus 100 can be furnished at a low cost and can be utilized popularly.

Also, with the radiation image read-out and reproducing apparatus 100, wherein the radiation image read-out apparatus 20 of FIG. 7 is employed as the image read-out section, the stimulating rays are filtered out by the thin-film interference filter 223 and are thus prevented from being detected photoelectrically. Further, the thin-film interference filter 223 is formed directly on the light entry end faces 22a, 22a, . . . of the optical fibers 22i and is located such that it may be approximately in close contact with the IP 10. Therefore, the light emitted by the IP 10 can be prevented from diffusing, and an image signal having a high signal-to-noise ratio can be obtained.

In the radiation image read-out apparatus 20 of FIG. 7, the thin-film interference filter 223 is formed on the light entry end faces 22a, 22a, . . . of the optical fibers 22i. Alternatively, in an embodiment of the fourth radiation image read-out apparatus in accordance with the present invention, as illustrated in FIG. 8, the thin-film interference filter 223 may be formed on the light radiating end faces 22b, 22b, . . . of the optical fibers 22i.

Figure 8:
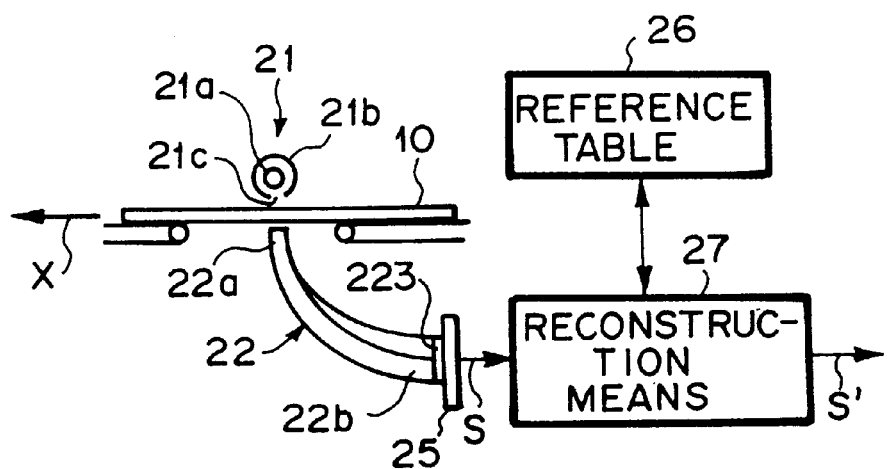
FIG. 8 is a side view showing an embodiment of the fourth radiation image read-out apparatus in accordance with the present invention.
Figure 9:
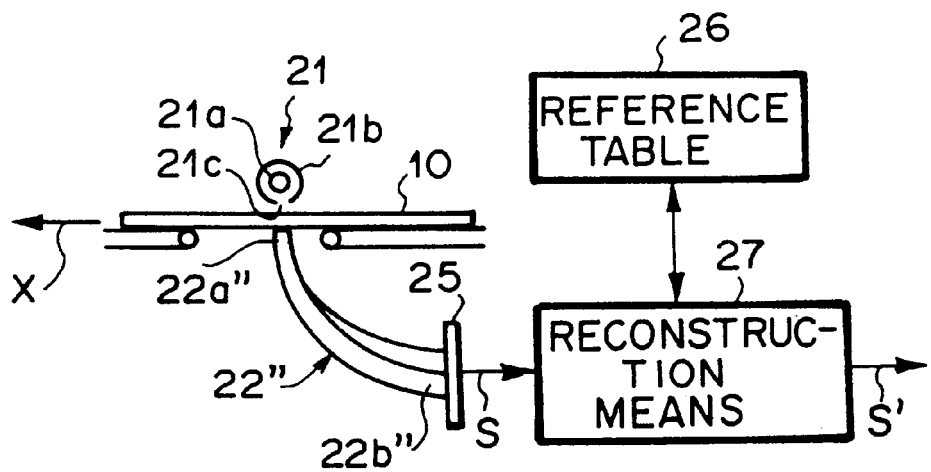
FIG. 9 is a side view showing an embodiment of the fifth radiation image read-out apparatus in accordance with the present invention.

In the embodiment of FIG. 7 or FIG. 8, as means for preventing the stimulating rays from being detected photoelectrically, the thin-film interference filter 223 is formed on the light entry end faces 22a, 22a, . . . or the light radiating end faces 22b, 22b, . . . of the optical fibers 22i. As another alternative, in an embodiment of the fifth radiation image read-out apparatus in accordance with the present invention, as illustrated in FIG. 9, the optical fibers themselves of an optical fiber bundle 22", may be imparted with the functions for cutting off the stimulating rays. Specifically, the optical fibers of the optical fiber bundle 22" illustrated in FIG. 9 contain a material obstructing the passage of the stimulating rays and allowing the passage of the light emitted by the stimulable phosphor sheet (e.g., a blue-color forming ionic substance, such as $Co^{2+}$ or $Cu^{2+}$). With this embodiment of the fifth radiation image read-out apparatus in accordance with the present invention, wherein the optical fibers themselves of the optical fiber bundle 22" have the functions for separating the stimulating rays, it is unnecessary for a particular means (i.e. a thin-film interference filter, or the like) for the separation of the stimulating rays to be located in the optical path of the light emitted by the IP 10. As a result, the IP 10 and light entry end faces 22a", 22a", . . . of the optical fibers can be located such that they may be in close contact with each other. Also, light radiating end faces 22b", 22b", . . . of the optical fibers and the photoelectric conversion means can be located such that they may be in close contact with each other. Accordingly, the problems can be prevented from occurring in that the efficiency, with which the light emitted by the IP 10 is detected, becomes low due to the diffusion of the emitted light from the IP 10 and the diffusion of the emitted light from the light radiating end faces 22b", 22b", of the optical fibers.

An embodiment of the sixth radiation image read-out apparatus in accordance with the present invention will be described hereinbelow with reference to FIG. 10.

Figure 10:
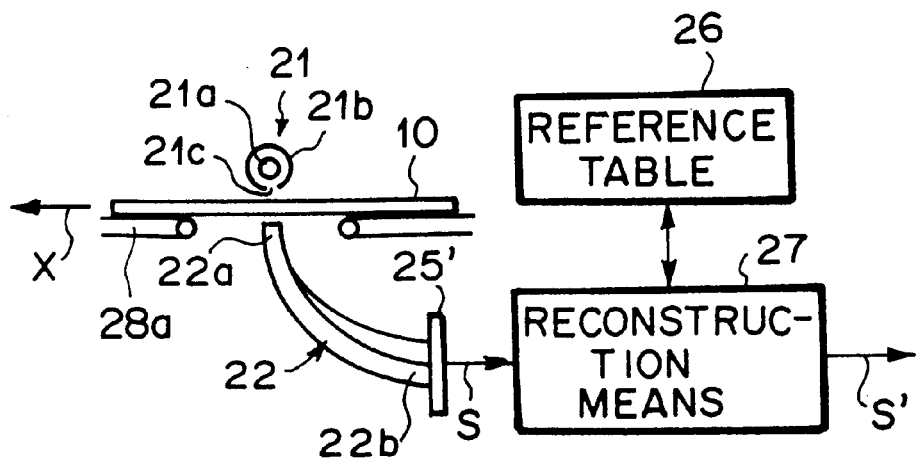
FIG. 10 is a side view showing an embodiment of the sixth radiation image read-out apparatus in accordance with the present invention.

As in the radiation image read-out apparatus 20 illustrated in FIG. 1A and FIG. 1B, a radiation image read-out apparatus 20 illustrated in FIG. 10 is provided with the linear stimulating ray source 21 extending in the direction that is approximately normal to the direction, which is indicated by the arrow X and along which the IP 10 is conveyed by the conveyor belts 28a and 28b. The linear stimulating ray source 21 produces the stimulating rays and irradiates the stimulating rays to the IP 10. The stimulating rays cause the IP 10 to emit light in proportion to the amount of energy stored thereon during its exposure to radiation. The radiation image read-out apparatus 20 also comprises a CCD image sensor 25', which is constituted of a plurality of photoelectric conversion devices arrayed in a two-dimensional form. (The photoelectric conversion devices correspond to an array of approximately 400,000 picture elements, i.e. an array of 632 picture elements located along the horizontal direction×632 picture elements located along the vertical direction.) The radiation image read-out apparatus 20 further comprises the optical fiber bundle 22, which is constituted of a plurality of the optical fibers 22i having the light entry end faces 22a, 22a, . . . and the light radiating end faces 22b, 22b, . . . The light entry end faces 22a, 22a, . . . of the optical fibers 22i stand facing a portion of the back surface of the IP 10, which portion corresponds to a portion of the front surface of the IP 10 exposed to the stimulating rays produced by the linear stimulating ray source 21. The light entry end faces 22a, 22a, . . . of the optical fibers 22i are located at a position close to the aforesaid portion of the back surface of the IP 10. Also, as illustrated in FIG. 3A, the light entry end faces 22a, 22a, . . . of the optical fibers 22i are arrayed so as to stand in a line in the direction, along which the linear stimulating ray source 21 extends. The light radiating end faces 22b, 22b, . . . of the optical fibers 22i are bundled so as to spread in a two-dimensional plane as illustrated in FIG. 3A or FIG. 3B and are located at a position close to the light receiving surface of the CCD image sensor 25' so as to stand facing the light receiving surface of the CCD image sensor 25'. The radiation image read-out apparatus 20 still further comprises the reference table 26, in which the correspondence relationship between the position of each of the optical fibers 22i in the bundle on the side of the light entry end faces 22a, 22a, . . . and the corresponding photoelectric conversion device has been set previously. The radiation image read-out apparatus 20 also comprises the reconstruction means 27 for reconstructing the electric signal components, which have been detected by the photoelectric conversion devices and constitute an image signal S, into an array that is in accordance with the array of the optical fibers 22i on the side of the light entry end faces 22a, 22a, . . . . The reconstruction is carried out in accordance with the correspondence relationship, which has been set in the reference table 26. From the reconstruction, an image signal S', which is made up of a series of electric signal components having been rearranged into the array corresponding to the spatial positions on the IP 10, is obtained.

The CCD image sensor 25' serving as the photoelectric conversion means is located at a position very close to the light radiating end faces 22b, 22b, . . . of the optical fibers 22i, such that the light signal components radiated out of the optical fibers 22i may impinge approximately uniformly upon the photoelectric conversion surface of the CCD image sensor 25', at which the photoelectric conversion devices corresponding to approximately 400,000 picture elements are arrayed. The aperture ratio of the CCD image sensor 25' is 50%, and its QE is 60%. The above-enumerated values are mere examples appropriate for efficiently collecting and detecting the light emitted by the IP 10, and the sixth radiation image read-out apparatus in accordance with the present invention is not limited to such examples.

As illustrated in FIG. 11, the CCD image sensor 25' has the spectral sensitivity characteristics such that the sensitivity with respect to the light emitted by the IP 10 (having wavelengths falling within the range of 350 nm to 450 nm) may be high, and such that the sensitivity with respect to the stimulating rays produced by the linear stimulating ray source 21 may be as low as substantially zero. As the stimulating rays, a red laser beam having wavelengths falling within the range of 633 nm (a laser beam produced by a He—Ne laser) to 690 nm (a laser beam produced by a read laser diode) is employed. The spectral sensitivity characteristics are due to the band gap of the material constituting the photoelectric converting section of the CCD image sensor 25'. As the material having the band gap yielding the spectral sensitivity characteristics illustrated in FIG. 11, by way of example, a gallium phosphide (GaP) type of material may be employed.

Also, in the embodiment of FIG. 10, in cases where the efficiency, with which the emitted light is detected, can be prevented from becoming low and cross talk can be prevented efficiently, the optical fiber bundle 22, and the like, may be located on the same side as the linear stimulating ray source 21. As another alternative, the set of the linear stimulating ray source 21, the optical fiber bundle 22, and the like, may be located on one surface side of the IP 10, and another set of the linear stimulating ray source 21, the optical fiber bundle 22, and the like, may be located on the other surface side of the IP 10, such that the image read-out operation can be carried out on opposite surface sides of the IP 10.

Figure 12A:
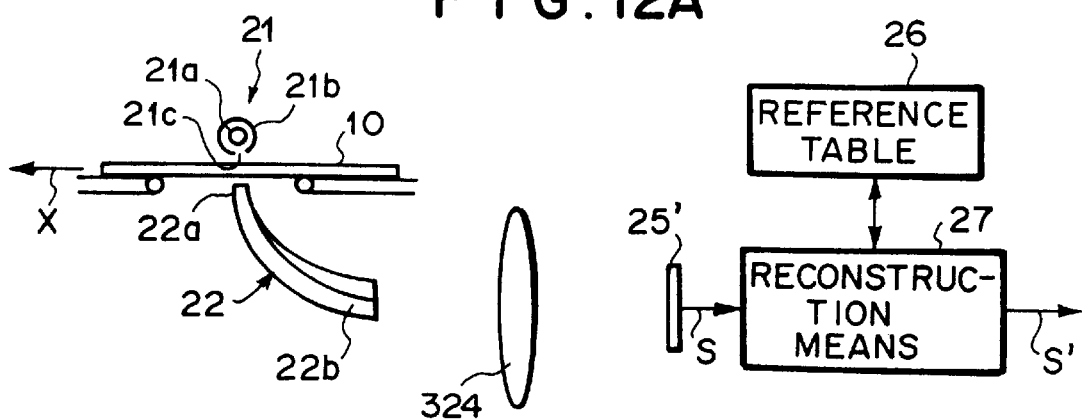
FIG. 12A is a side view showing a different embodiment of the sixth radiation image read-out apparatus in accordance with the present invention.
Figure 12B:
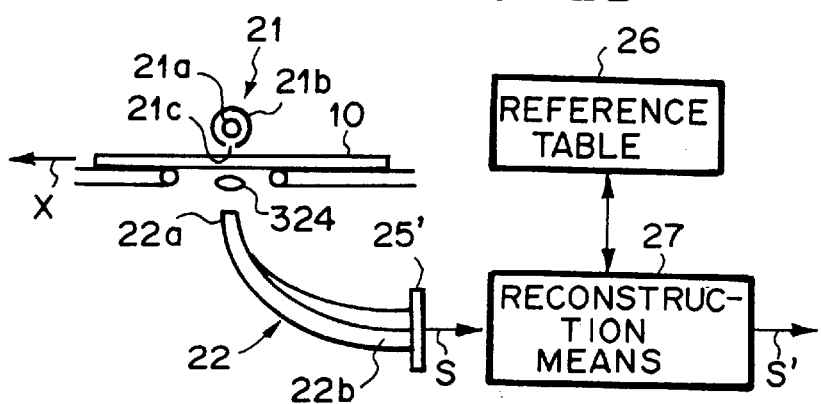
FIG. 12B is a side view showing a further different embodiment of the sixth radiation image readout apparatus in accordance with the present invention.

As illustrated in FIG. 12B, in cases where it is difficult for the IP 10 and the light entry end faces 22a, 22a, . . . of the optical fibers 22i of the optical fiber bundle 22 to be located at positions close to each other as in the embodiment of FIG. 10, the IP 10 and the light entry end faces 22a, 22a, . . . of the optical fibers 22i may be spaced apart from each other, and a converging optical system 324 may be located between them. In this manner, the emitted light diverging from the IP 10 may be converged by the converging optical system 324 and guided to the light entry end faces 22a, 22a, . . . of the optical fibers 22i. Also, as illustrated in FIG. 12A, in cases where it is difficult for the light radiating end faces 22b, 22b, . . . of the optical fibers 22i and the CCD image sensor 25' to be located at positions close to each other, the light radiating end faces 22b, 22b, . . . of the optical fibers 22i and the CCD image sensor 25' may be spaced apart from each other, and the converging optical system 324, such as a converging lens, may be located between them. In this manner, the emitted light diverging from the light radiating end faces 22b, 22b, . . . of the optical fibers 22i may be converged by the converging optical system 324 and guided to the photoelectric conversion devices of the CCD image sensor 25' as illustrated in FIG. 4. In the embodiment of FIG. 12B, wherein the IP 10 and the light entry end faces 22a, 22a, . . . of the optical fibers 22i are spaced apart from each other and the converging optical system 324 is located between them, it is necessary for the converging optical system 324 to converge the light, which is emitted from part of the IP 10 that stands facing the light entry end face 22a of one of the optical fibers 22i, and to cause the converged light to enter into the optical fiber. Therefore, in such cases, a distributed index lens array comprising an array of a plurality of small distributed index lenses, such as SELFOC lenses (trade name), should preferably be employed as the converging optical system 324. The distributed index lens array is located such that each of the distributed index lenses may stand facing one of the light entry end faces 22a, 22a, of the optical fibers 22i.

The light radiating end faces 22b, 22b, . . . of the 2,000 optical fibers 22i and the CCD image sensor 25, having 400,000 picture elements correspond to each other as illustrated in FIG. 4.

As in the radiation image read-out apparatus 20 illustrated in FIG. 1A and FIG. 1B, the radiation image read-out apparatus 20 of FIG. 10 can be incorporated as the image read-out section 20 in the radiation image read-out and reproducing apparatus 100 illustrated in FIG. 2A and FIG. 2B. In the image read-out section 20, the light is emitted from the front surface and the back surface of the IP 10. Also, of the stimulating rays, which have been irradiated to the front surface of the IP 10, a portion having passed through the IP 10 is radiated out of the back surface of the IP 10. The light, which has thus been emitted from each of small portions of the back surface of the IP 10, and the portion of the stimulating rays, which is radiated out of the back surface of the IP 10, enter from one of the light entry end faces 22a, 22a, . . . , which is located at the position corresponding to the small portion of the back surface, into the corresponding optical fiber 22i. In this manner, the linear light, which has been emitted from the portion of the IP 10 exposed to the linear stimulating rays having been produced by the linear stimulating ray source 21, is divided into the light signal components corresponding to 2,000 picture elements, the number of which is equal to the number of the optical fibers 22i.

The light signal components corresponding to the respective picture elements are guided through the optical fibers 22i by repeating total reflection and up to the light radiating end faces 22b, 22b, . . . . The light signal components are then radiated out of the light radiating end faces 22b, 22b, . . . and guided to the photo detection surface of the CCD image sensor 25', which is located at the position close to the light radiating end faces 22b, 22b, . . . of the optical fibers 22i. In cases where the light radiating end faces 22b, 22b, . . . of the optical fiber bundle 22 are bundled in the form illustrated in FIG. 3A, the images of the light signal components are formed in the pattern illustrated in FIG. 4 on the photo detection surface (the surfaces of the photoelectric conversion devices) of the CCD image sensor 25'.

The CCD image sensor 25' has the spectral sensitivity characteristics illustrated in FIG. 11. Therefore, the CCD image sensor 25' has substantially no sensitivity with respect to the laser beam serving as the stimulating rays and has a sufficiently high level of sensitivity with respect to the light emitted by the IP 10. Accordingly, of the emitted light and the stimulating rays, which are radiated out of the back surface of the IP 10, only the emitted light is converted into the electric signal in accordance with the intensity of the emitted light, and the stimulating rays serving as noise are substantially not converted into an electric signal. As a result, the signal-to-noise ratio of the electric signal, which represents the information of the emitted light and is obtained from the conversion with the CCD image sensor 25', can be kept high.

As described above, with the radiation image read-out and reproducing apparatus 100, wherein the radiation image read-out apparatus 20 of FIG. 10 is employed as the image read-out section, it is unnecessary to use high-cost devices, such as a conventional laser beam source, a laser beam scanning system, and a photomultiplier, as in the conventional radiation image read-out and reproducing apparatus, and the light emitted by the IP 10 can be separated into light signal components corresponding to the picture elements. Therefore, the production cost of the radiation image read-out and reproducing apparatus 100 can be kept markedly lower than the production cost of the conventional radiation image read-out and reproducing apparatus. Accordingly, the radiation image read-out and reproducing apparatus 100 can be furnished at a low cost and can be utilized popularly.

An embodiment of the seventh radiation image read-out apparatus in accordance with the present invention will be described hereinbelow with reference to FIG. 13.

Figure 13:
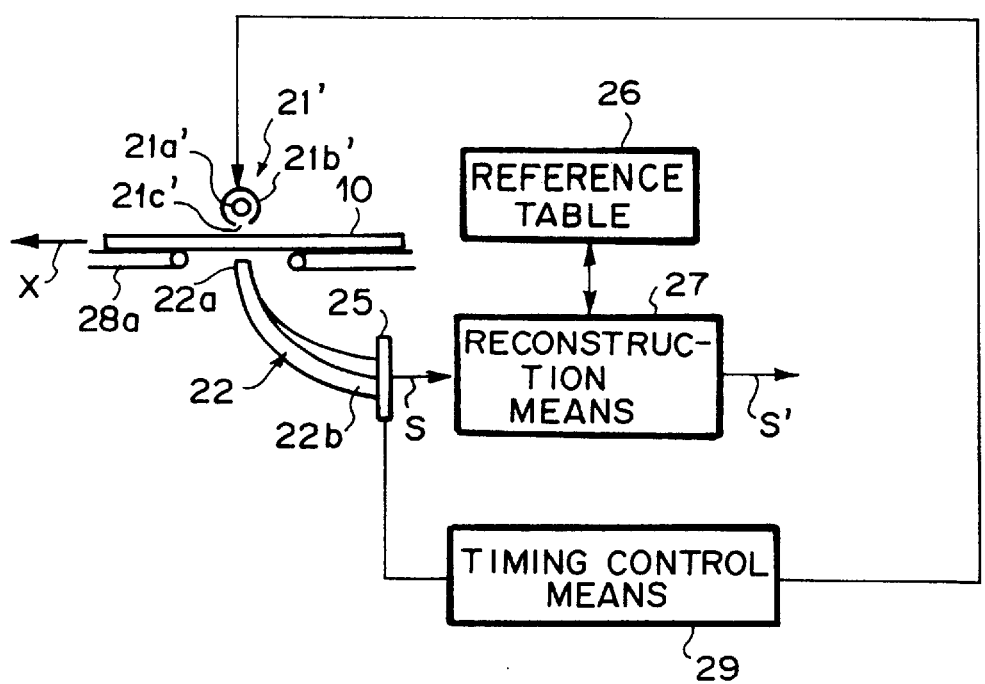
FIG. 13 is a side view showing an embodiment of the seventh radiation image read-out apparatus in accordance with the present invention.

A radiation image read-out apparatus 20 illustrated in FIG. 13 comprises a linear stimulating ray source 21, extending in the direction that is approximately normal to the direction, which is indicated by the arrow X and along which the IP 10 is conveyed by the conveyor belts 28a and 28b shown in FIG. 1A. The linear stimulating ray source 21' produces pulsed stimulating rays (having wavelengths falling within the red wavelength range of 633 nm to 690 nm) and irradiates the stimulating rays to the IP 10. The stimulating rays cause the IP 10 to emit light in proportion to the amount of energy stored thereon during its exposure to radiation. The radiation image read-out apparatus 20 also comprises the CCD image sensor 25, which is constituted of a plurality of photoelectric conversion devices arrayed in a two-dimensional form. (The photoelectric conversion devices correspond to an array of approximately 400,000 picture elements, i.e. an array of 632 picture elements located along the horizontal direction×632 picture elements located along the vertical direction.) The radiation image read-out apparatus 20 further comprises the optical fiber bundle 22, which is constituted of a plurality of the optical fibers 22i having the light entry end faces 22a, 22a, . . . and the light radiating end faces 22b, 22b, . . . . The light entry end faces 22a, 22a, . . . of the optical fibers 22i stand facing a portion of the back surface of the IP 10, which portion corresponds to a portion of the front surface of the IP 10 exposed to the stimulating rays produced by the linear stimulating ray source 21'. The light entry end faces 22a, 22a, . . . of the optical fibers 22i are located at a position close to the aforesaid portion of the back surface of the IP 10. Also, as illustrated in FIG. 3A, the light entry end faces 22a, 22a, . . . of the optical fibers 22i are arrayed so as to stand in a line in the direction, along which the linear stimulating ray source 21' extends. The light radiating end faces 22b, 22b, . . . of the optical fibers 22i are bundled so as to spread in a two-dimensional plane as illustrated in FIG. 3A or FIG. 3B and are located at a position close to the light receiving surface of the CCD image sensor 25 so as to stand facing the light receiving surface of the CCD image sensor 25. The radiation image read-out apparatus 20 still further comprises the reference table 26, in which the correspondence relationship between the position of each of the optical fibers 22i in the bundle on the side of the light entry end faces 22a, 22a, . . . and the corresponding photoelectric conversion device has been set previously. The radiation image read-out apparatus 20 also comprises the reconstruction means 27 for reconstructing the electric signal components, which have been detected by the photoelectric conversion devices and constitute an image signal S, into an array that is in accordance with the array of the optical fibers 22i on the side of the light entry end faces 22a, 22a, . . . . The reconstruction is carried out in accordance with the correspondence relationship, which has been set in the reference table 26. From the reconstruction, an image signal S', which is made up of a series of electric signal components having been rearranged into the array corresponding to the spatial positions on the IP 10, is obtained. The radiation image read-out apparatus 20 further comprises a timing control means 29 for controlling the linear stimulating ray source 21' and the CCD image sensor 25. The timing control means 29 controls the linear stimulating ray source 21' such that it may produce the pulsed stimulating rays for a period of 1 $\mu$sec with a predetermined timing. Also, the timing control means 29 controls the CCD image sensor 25 such that it may reset the photoelectric signal, which has been accumulated in accordance with the received light, for the period during which the linear stimulating ray source 21' is producing the pulsed stimulating rays, and such that it may accumulate the photoelectric signal, which is generated in accordance with the light emitted by the IP 10 with a response delay, for a period of 10 $\mu$sec beginning immediately after the irradiation of the pulsed stimulating rays is finished.

Figure 14:
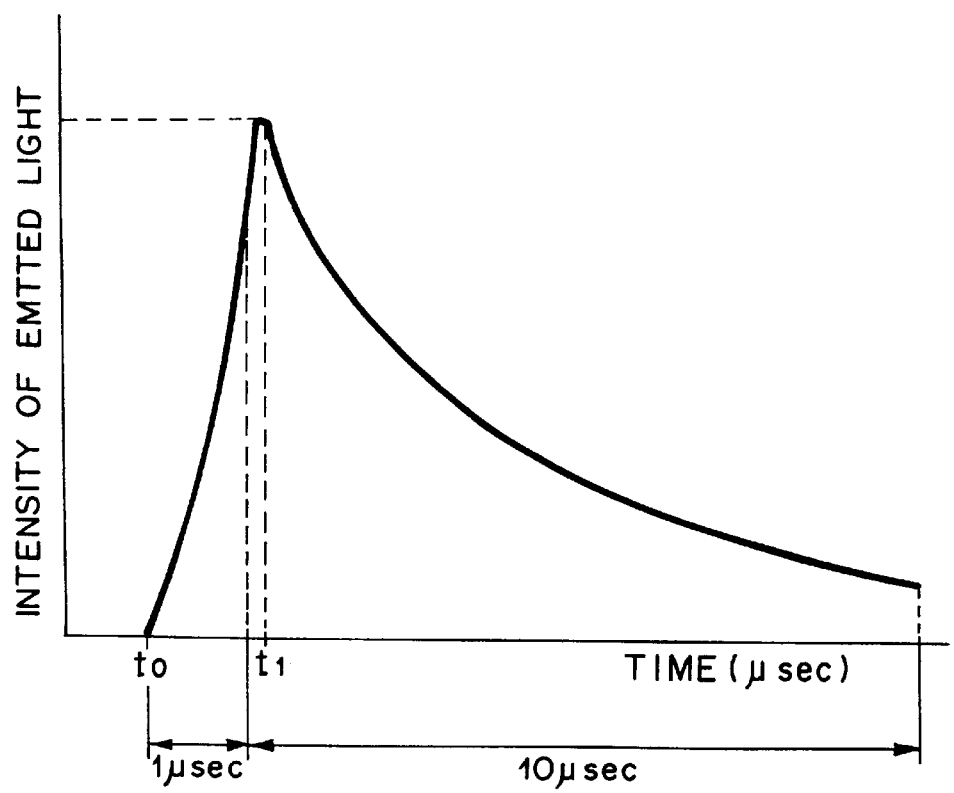
FIG. 14 is a graph showing after-glow characteristics of a stimulable phosphor.

The stimulable phosphor layer, which is formed on the lower surface side of the IP 10 in FIG. 13 (i.e., the side facing the optical fiber bundle 22 and opposite to the side on which the linear stimulating ray source 21' is located), contains BaFCl and has the after-glow characteristics shown in FIG. 14. Specifically, the stimulable phosphor layer exhibits a predetermined response delay time $\Delta t$ (=t1−t0), which is taken from when the exposure of the IP 10 to the stimulating rays is begun (at the time t0) to when the intensity of the light emitted by the IP 10 (having wavelengths falling within the range of 350 nm to 450 nm) becomes maximum (at the time t1). In this embodiment, the response delay time $\Delta t$ is set to be slightly longer than 1 $\mu$sec.

FIG. 15A is a graph showing the after-glow characteristics of the IP 10. FIG. 15B is a graph showing the timing, with which the linear stimulating ray source 21' is operated. FIG. 15C is a graph showing the timing, with which the CCD image sensor 25 is operated. FIG. 15D is a graph showing the condition, in which the photoelectric signal is accumulated in the CCD image sensor 25.

The linear stimulating ray source 21' comprises the cylindrical reflecting mirror 21b and a pulsed stimulating ray source 21a', which is located on the side inward from the cylindrical reflecting mirror 21b. The cylindrical reflecting mirror 21b has the slit 21c at a portion of the circumferential surface. The slit 21c extends in a direction parallel to the center axis of the cylindrical reflecting mirror 21b. The pulsed stimulating rays, which have passed through the slit 21c, are irradiated as the linear stimulating rays to the IP 10. In order for the degree, with which the stimulating rays radiated out of the slit 21c are collected, may be kept high, a cylindrical lens having no power with respect to the direction, along which the slit 21c extends, may be located along the slit 21c.

The CCD image sensor 25 serving as the photoelectric conversion means is located at a position very close to the light radiating end faces 22b, 22b, of the optical fibers 22i, such that the light signal components radiated out of the optical fibers 22i may impinge approximately uniformly upon the photoelectric conversion surface of the CCD image sensor 25, at which the photoelectric conversion devices corresponding to approximately 400,000 picture elements are arrayed. The aperture ratio of the CCD image sensor 25 is 50%, and its QE is 60%. The above-enumerated values are mere examples appropriate for efficiently collecting and detecting the light emitted by the IP 10, and the seventh radiation image read-out apparatus in accordance with the present invention is not limited to such examples.

Also, in the embodiment of FIG. 13, in cases where the efficiency, with which the emitted light is detected, can be prevented from becoming low and cross talk can be prevented efficiently, the optical fiber bundle 22, and the like, may be located on the same side as the linear stimulating ray source 21'. As another alternative, the set of the linear stimulating ray source 21', the optical fiber bundle 22, and the like, may be located on one surface side of the IP 10, and another set of the linear stimulating ray source 21', the optical fiber bundle 22, and the like, may be located on the other surface side of the IP 10, such that the image read-out operation can be carried out on opposite surface sides of the IP 10.

Figure 16A:
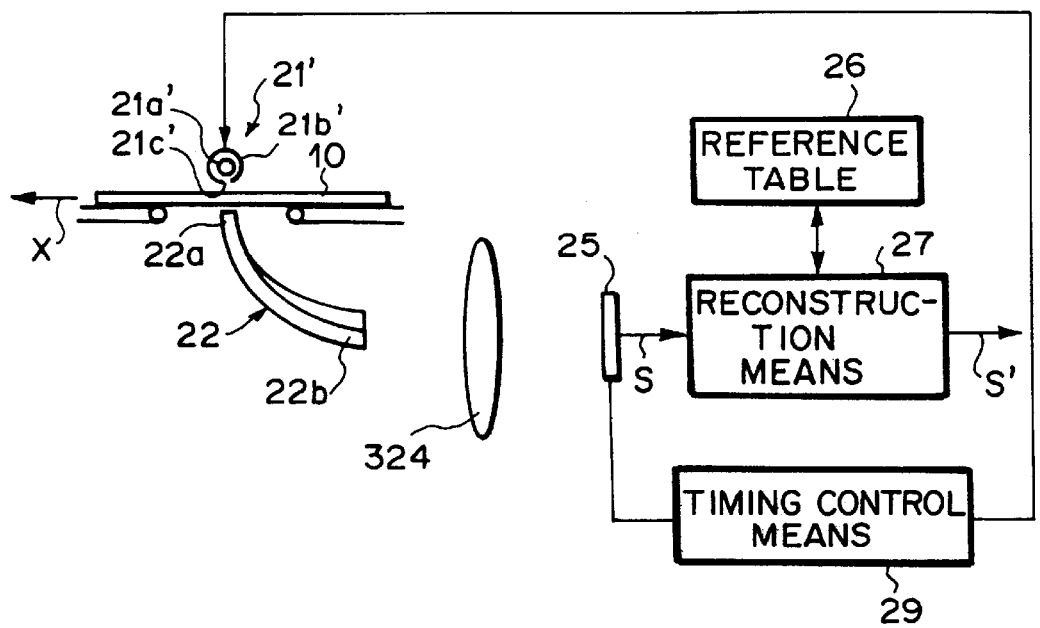
FIG. 16A is a side view showing a different embodiment of the seventh radiation image read-out apparatus in accordance with the present invention.
Figure 16B:
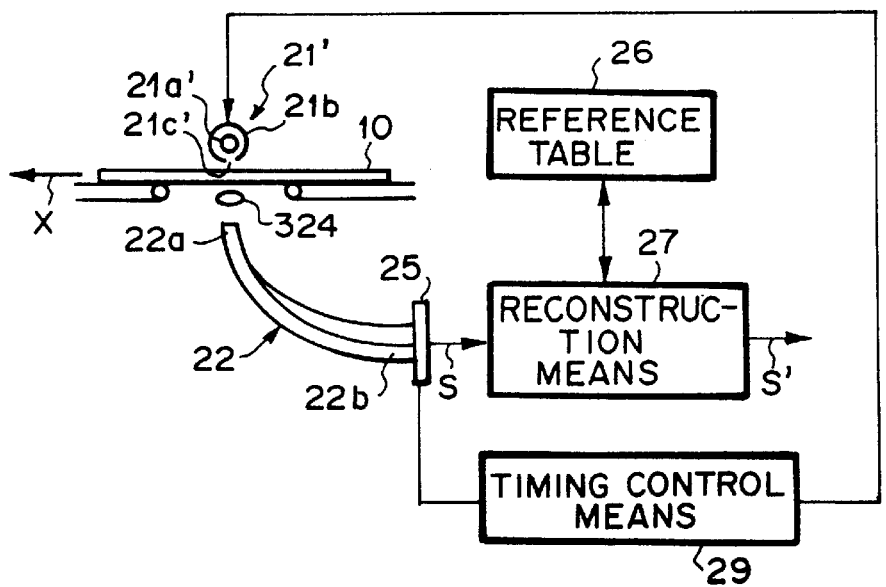
FIG. 16B is a side view showing a further different embodiment of the seventh radiation image read-out apparatus in accordance with the present invention.

As illustrated in FIG. 16B, in cases where it is difficult for the IP 10 and the light entry end faces 22a, 22a, . . . of the optical fibers 22i of the optical fiber bundle 22 to be located at positions close to each other as in the embodiment of FIG. 13, the IP 10 and the light entry end faces 22a, 22a, . . . of the optical fibers 22i may be spaced apart from each other, and the converging optical system 324 may be located between them. In this manner, the emitted light diverging from the IP 10 may be converged by the converging optical system 324 and guided to the light entry end faces 22a, 22a, . . . of the optical fibers 22i. Also, as illustrated in FIG. 16A, in cases where it is difficult for the light radiating end faces 22b, 22b, . . . of the optical fibers 22i and the CCD image sensor 25 to be located at positions close to each other, the light radiating end faces 22b, 22b, . . . of the optical fibers 22i and the CCD image sensor 25 may be spaced apart from each other, and the converging optical system 324, such as a converging lens, may be located between them. In this manner, the emitted light diverging from the light radiating end faces 22b, 22b, . . . of the optical fibers 22i may be converged by the converging optical system 324 and guided to the photoelectric conversion devices of the CCD image sensor 25 as illustrated in FIG. 4. In the embodiment of FIG. 16B, wherein the IP 10 and the light entry end faces 22a, 22a, . . . of the optical fibers 22i are spaced apart from each other and the converging optical system 324 is located between them, it is necessary for the converging optical system 324 to converge the light, which is emitted from part of the IP 10 that stands facing the light entry end face 22a of one of the optical fibers 22i, and to cause the converged light to enter into the optical fiber. Therefore, in such cases, a distributed index lens array comprising an array of a plurality of small distributed index lenses, such as SELFOC lenses (trade name), should preferably be employed as the converging optical system 324. The distributed index lens array is located such that each of the distributed index lenses may stand facing one of the light entry end faces 22a, 22a, of the optical fibers 22i.

As in the radiation image read-out apparatus 20 illustrated in FIG. 1A and FIG. 1B, the radiation image read-out apparatus 20 of FIG. 13 can be incorporated as the image read-out section 20 in the radiation image read-out and reproducing apparatus 100 illustrated in FIG. 2A and FIG. 2B.

In the image read-out section 20, the IP 10 is set on the two conveyor belts 28a and 28b and conveyed in the direction indicated by the arrow X. While the IP 10 is being thus conveyed, the front surface of the IP 10 (the upper surface in FIG. 13) is exposed to the linear pulsed stimulating rays, which are produced for the period of 1 $\mu$sec by the linear stimulating ray source 21' controlled by the timing control means 29. When the linear portion of the IP 10 is exposed to the pulsed stimulating rays, it emits the light such that the intensity of the emitted light may become maximum at the time t1, which is delayed by $\Delta t$ from the beginning of the exposure to the pulsed stimulating rays (at the time t0) due to the response delay of the stimulable phosphor contained at the linear portion of the IP 10.

At this time, the light is emitted from the front surface and the back surface of the IP 10. Also, for the period during which the pulsed stimulating rays are irradiated (i.e., for the period of 1 μsec beginning at the time to), of the stimulating rays, which have been irradiated to the front surface of the IP 10, a portion having passed through the IP 10 is radiated out of the back surface of the IP 10. The light, which has thus been emitted from each of small portions of the back surface of the IP 10, and the portion of the stimulating rays, which is radiated out of the back surface of the IP 10, enter from one of the light entry end faces 22a, 22a, . . . , which is located at the position corresponding to the small portion of the back surface, into the corresponding optical fiber 22i. In this manner, the linear light, which has been emitted from the portion of the IP 10 exposed to the linear stimulating rays having been produced by the linear stimulating ray source 21', is divided into the light signal components corresponding to 2,000 picture elements, the number of which is equal to the number of the optical fibers 22i.

The light signal components, which correspond to the respective picture elements, and the stimulating rays are guided through the optical fibers 22i by repeating total reflection and up to the light radiating end faces 22b, 22b, . . . . The light signal components and the stimulating rays are then radiated out of the light radiating end faces 22b, 22b, . . . and guided to the photo detection surface of the CCD image sensor 25, which is located at the position close to the light radiating end faces 22b, 22b, . . . of the optical fibers 22i. In cases where the light radiating end faces 22b, 22b, . . . of the optical fiber bundle 22 are bundled in the form illustrated in FIG. 3A, the images of the light signal components are formed in the pattern illustrated in FIG. 4 on the photo detection surface (the surfaces of the photoelectric conversion devices) of the CCD image sensor 25.

As illustrated in FIG. 15C, the CCD image sensor 25 is controlled by the timing control means 29 such that, for the period during which the IP 10 is being exposed to the pulsed stimulating rays (i.e., for the period of 1 μsec beginning at the time to), the CCD image sensor 25 may reset the photoelectric signal, which has been accumulated in accordance with the received light. Therefore, as illustrated in FIG. 15D, during the aforesaid period, no electric charges are accumulated in the CCD image sensor 25.

At the time at which the period of 1 μsec has elapsed from the time t0, the linear stimulating ray source 21' is turned off by the timing control means 29. At this time, even though the pulsed stimulating rays are thus turned off, the linear portion of the IP 10 having been exposed to the pulsed stimulating rays continues to emit the light with the response delay of the stimulable phosphor contained at the linear portion.

As in the cases described above, the light emitted by the IP 10 passes through the IP 10 and is radiated out of the back surface of the IP 10. At this time, since the stimulating rays have already been turned off, they are not radiated out of the back surface of the IP 10.

Also, as in the cases described above, the light, which has thus been emitted from each of small portions of the back surface of the IP 10, enters from one of the light entry end faces 22a, 22a, . . . , which is located at the position corresponding to the small portion of the back surface, into the corresponding optical fiber 22i. (In this case, only the emitted light enters into the optical fibers 22i, and the stimulating rays do not enter into the optical fibers 22i.) In this manner, the linear light, which has been emitted from the portion of the IP 10 exposed to the linear stimulating rays having been produced by the linear stimulating ray source 21', is divided into the light signal components corresponding to 2,000 picture elements, the number of which is equal to the number of the optical fibers 22i. The light signal components, which correspond to the respective picture elements, are guided through the optical fibers 22i by repeating total reflection and up to the light radiating end faces 22b, 22b, . . . . The light signal components are then radiated out of the light radiating end faces 22b, 22b, . . . and guided to the photo detection surface of the CCD image sensor 25, which is located at the position close to the light radiating end faces 22b, 22b, . . . of the optical fibers 22i.

As illustrated in FIG. 15C, the CCD image sensor 25 is controlled by the timing control means 29 such that, after the pulsed stimulating rays have been turned off (i.e., after the period of 1 μsec has elapsed from the time t0), the CCD image sensor 25 may accumulate the photoelectric signal in accordance with the received light. The photoelectric signal is accumulated as illustrated in FIG. 15D.

In this case, only the photoelectric signal corresponding to the light emitted by the IP 10 is accumulated in the CCD image sensor 25, and no photoelectric signal due to the stimulating rays is accumulated. Therefore, from the accumulated photoelectric signal, the image information stored on the IP 10 can be reproduced accurately. The accumulated photoelectric signal has a high signal-to-noise ratio.

At the time at which a period of 10 μsec has elapsed from when the pulsed stimulating rays were turned off (i.e., from when the period of 1 μsec had elapsed from the time to), the CCD image sensor 25 is controlled by the timing control means 29 such that the electric signal component, which has been obtained from each of the photoelectric conversion devices constituting the CCD image sensor 25, may be transmitted into the reconstruction means 27. From the reconstruction carried out by the reconstruction means 27, the image signal S', which is made up of a series of electric signal components having been rearranged into the array corresponding to the spatial positions on the IP 10 and has a high signal-to-noise ratio, can be obtained. The thus obtained image signal S' is fed into the image processing section 50.

As described above, with the radiation image read-out and reproducing apparatus 100, wherein the radiation image read-out apparatus 20 of FIG. 13 is employed as the image read-out section, it is unnecessary to use high-cost devices, such as a conventional laser beam source, a laser beam scanning system, and a photomultiplier, as in the conventional radiation image read-out and reproducing apparatus, and the light emitted by the IP 10 can be separated into light signal components corresponding to the picture elements. Therefore, the production cost of the radiation image read-out and reproducing apparatus 100 can be kept markedly lower than the production cost of the conventional radiation image read-out and reproducing apparatus. Accordingly, the radiation image read-out and reproducing apparatus 100 can be furnished at a low cost and can be utilized popularly.

In this embodiment of the seventh radiation image read-out apparatus in accordance with the present invention, the stimulable phosphor layer of the IP 10 contains BaFCl, and the timing control means 29 controls such that the period, during which the pulsed stimulating rays are turned on, may be 1 μsec and such that the period, during which the photoelectric signal is accumulated in the CCD image sensor 25, may be 10 μsec. However, the seventh radiation image read-out apparatus in accordance with the present invention is not limited to the aforesaid embodiment. The seventh radiation image read-out apparatus in accordance with the present invention may be embodied in various other ways, wherein the stimulating ray irradiation time is set or controlled to be shorter than the response delay time intrinsic to a stimulable phosphor contained in the IP 10 (the response delay time being taken from when the exposure of the IP 10 to the stimulating rays is begun to when the intensity of the light emitted by the IP 10 becomes maximum), and wherein the CCD image sensor 25 is controlled such that it can read out the light, which is emitted with the response delay by the IP 10, during the period after the irradiation of the pulsed stimulating rays is finished.

Also, in this embodiment of the seventh radiation image read-out apparatus in accordance with the present invention, the pulsed stimulating rays are turned on only one time. In cases where the emitted light having an acceptable level of intensity cannot be obtained due to the very short irradiation time, the step of turning the pulsed stimulating rays on, the step of resetting of the CCD image sensor 25, the step of turning the pulsed stimulating rays off, the step of accumulating the photoelectric signal in the CCD image sensor 25, and the step of transmitting the accumulated photoelectric signal may be repeated several times. Also, the total sum of the image signals S, S', . . . having thus been obtained from the repeated operations may be employed as the ultimate image signal.

What is claimed is:

1. A radiation image read-out apparatus, comprising:

i) a linear stimulating ray source for producing stimulating rays and linearly irradiating said stimulating rays to a portion of a stimulable phosphor sheet, on which a radiation image has been stored, said stimulating rays causing said stimulable phosphor sheet to emit light in proportion to the amount of energy stored thereon during its exposure to radiation, ii) a photoelectric read-out means for dividing the light, which is emitted from the portion of a front surface of said stimulable phosphor sheet exposed to said stimulating rays and/or the portion of a back surface of said stimulable phosphor sheet corresponding to said portion of the front surface exposed to said stimulating rays, into a plurality of picture elements along a length direction of said portion exposed to said stimulating rays, and photoelectrically reading out the plurality of the picture elements, which have been obtained from the division of the emitted light into the picture elements, by arraying the picture elements in a two-dimensional form, iii) a scanning means for moving said stimulable phosphor sheet with respect to said linear stimulating ray source and said division-into-picture-element photoelectric read-out means and in a direction, which is approximately normal to said length direction of said portion exposed to said stimulating rays, and iv) a stimulating ray separation means for obstructing the passage of said stimulating rays therethrough and allowing the passage of the emitted light therethrough, said stimulating ray separation means being located between said portion of said stimulable phosphor sheet, from which the light is emitted, and said division-into-picture element photoelectric read-out means;

wherein said division-into-picture-element photoelectric read-out means comprises:

a) a photoelectric conversion means, which is constituted of a plurality of photoelectric conversion devices arrayed in a two-dimensional form, b) an optical fiber bundle, which is constituted of a plurality of optical fibers, said optical fibers being bundled such that their light entry end faces may be arrayed so as to stand facing the portion of said stimulable phosphor sheet, from which the light is emitted when it is exposed to said stimulating rays, and so as to stand in a line along said length direction of said linear portion exposed to said stimulating rays, and such that their light radiating end faces may be arrayed arbitrarily so as to respectively stand facing different photoelectric conversion devices, c) a reference table, in which a correspondence relationship between the position of each of said optical fibers in the bundle on the side of said light entry end faces and the corresponding photoelectric conversion device has been set previously, and d) a reconstruction means for reconstructing electric signal components, which have been detected by said photoelectric conversion devices, into an array that is in accordance with the array of said optical fibers on the side of said light entry end faces, said reconstruction being carried out in accordance with said correspondence relationship, which has been set in said reference table, wherein said stimulating ray separation means is a stimulating ray separation filter, which is located between said light entry end faces of said optical fibers of said optical fiber bundle and said stimulable phosphor sheet, and wherein the radiation image read-out apparatus further comprises a distributed index lens array of an erecting-magnification system, which is constituted of an array of a plurality of distributed index lenses and located between said stimulating ray separation filter and said stimulable phosphor sheet, each of said distributed index lenses converging the light, which is emitted from part of said stimulable phosphor sheet that stands facing the light entry end face of one of said optical fibers, and causing the converged light to enter into said one optical fiber.

* * * * *